United States Patent
Shibuya

(10) Patent No.: US 8,658,718 B2
(45) Date of Patent: Feb. 25, 2014

(54) MOLDING MATERIAL, USE THEREOF, AND PROCESS FOR PRODUCING MOLDING MATERIAL

(75) Inventor: Atsushi Shibuya, Funabashi (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 558 days.

(21) Appl. No.: 11/919,568

(22) PCT Filed: May 17, 2006

(86) PCT No.: PCT/JP2006/309802
§ 371 (c)(1),
(2), (4) Date: Oct. 30, 2007

(87) PCT Pub. No.: WO2006/123679
PCT Pub. Date: Nov. 23, 2006

(65) Prior Publication Data
US 2010/0016542 A1   Jan. 21, 2010

(30) Foreign Application Priority Data
May 19, 2005   (JP) .................................. 2005-146276

(51) Int. Cl.
*C08K 5/49*   (2006.01)
*C08K 5/3432*   (2006.01)
*G11B 7/00*   (2006.01)

(52) U.S. Cl.
USPC ........ 524/115; 524/102; 524/99; 369/112.01; 156/308.2; 528/396; 428/407; 428/357

(58) Field of Classification Search
USPC ...................... 524/99, 115, 102; 369/112.01; 156/308.2; 528/396; 428/407, 357
See application file for complete search history.

(56) References Cited

FOREIGN PATENT DOCUMENTS

| | | | |
|---|---|---|---|
| EP | 1767576 | * | 3/2007 |
| JP | 07-216152 | A | 8/1995 |
| JP | 09-268250 | A | 10/1997 |
| JP | 2001-072839 | A | 3/2001 |
| JP | 2003-276047 | A | 9/2003 |
| JP | 2004-083813 | A | 3/2004 |
| WO | WO 01/92412 | A1 | 12/2001 |
| WO | WO 02/092668 | * | 11/2002 |

* cited by examiner

*Primary Examiner* — James J Seidleck
*Assistant Examiner* — Deve E Valdez
(74) *Attorney, Agent, or Firm* — Buchanan Ingersoll & Rooney PC

(57) ABSTRACT

A molding material of the present invention includes a polymer having a repeating structural unit whose part or whole contains an alicyclic structure, a phenolic stabilizer, a hindered amine light stabilizer and a phosphorus stabilizer, in which at least a part of the phenolic stabilizer and/or hindered amine light stabilizer is presently adhering to the surface of particles of the above polymer.

5 Claims, 1 Drawing Sheet

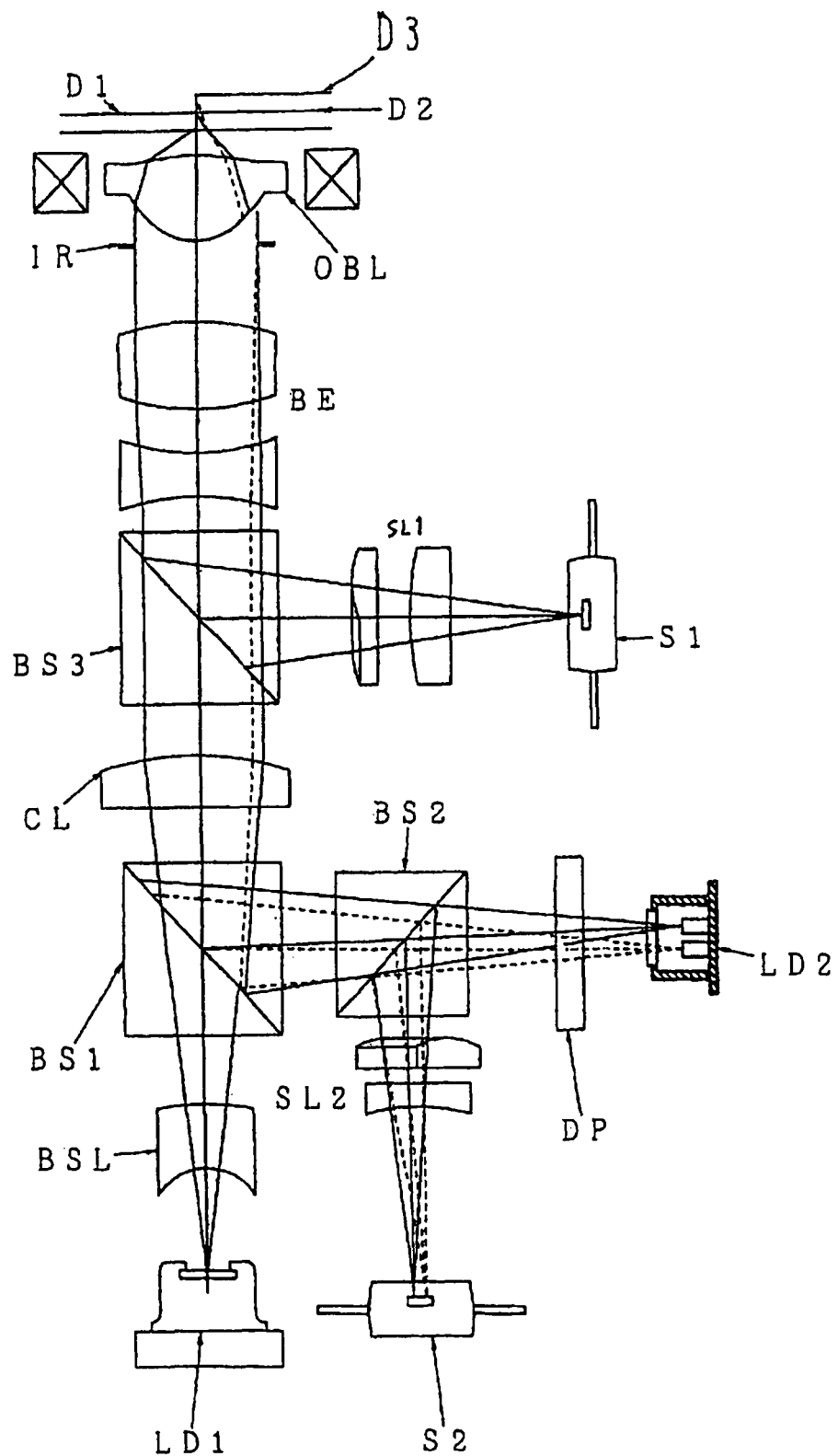

MOLDING MATERIAL, USE THEREOF, AND PROCESS FOR PRODUCING MOLDING MATERIAL

TECHNICAL FIELD

The present invention relates to a molding material, use thereof, and a process for producing the molding material. Specifically, the present invention relates to a optical pickup device employing a blue-violet laser light beam source with a wavelength of around 405 nm, a molding material suitable for the use in the optical component used for the optical pickup device, an optical component produced from molding material, and a optical pickup device and a process for producing the molding material.

BACKGROUND ART

The optical pickup device (also referred to as an optical head, an optical head device, or the like) for replaying and recording the information on a light information recording medium (also referred to as an optical disk, or a medium) such as a CD (a compact disk), DVD (a digital video disk, or a digital versatile disk) have been developed and produced, and thus popularized.

Recently, the standard of the information recording medium which enabled the higher density information recording has been researched and developed.

Such optical pickup device forms a spot by collecting beam of light emitted from mainly a laser diode as a light source through an optical system including an optical component such as a beam shaping prism, a collimator, a beam splitter, an objective optical component, or the like, onto the information recording face of an optical disc, next collects reflection from an information recording hole (also called as a pit) on the recording face through a same optical system onto a sensor at this time, and then converts into an electrical signal, to playback the information. During this time, '0' and '1' information are discriminated based on the phenomenon that the light beam of reflectance varies according to the shape of the information recording hole. On the information recording face of an optical disc, a protective layer made of plastic, which is also called as a cover glass, is provided as a protective substrate.

When recording information on recording type media such as CD-R, CD-RW, and the like, a spot resulted from the laser beam is formed on a recording surface and a thermochemical change is generated in a recording material on the recording face. Accordingly, for example in the case of CD-R, the thermal diffusivity pigment is irreversibly changed and a shape same to the information recording hole is formed. In the case of CD-RW, since a phase change-type material is used, a reversible change between a crystalline state and non-crystalline state by the thermochemical change is generated, and thus the rewriting of the information is possible.

For the optical pickup device for playing back the information from an optical disc of a CD standard, the numerical aperture (NA) of an objective lens is around 0.45, and the wavelength of a light source for use is around 785 nm. In addition, as for the recording, ones having 0.50 in approximate is a lot used. Herein, the thickness of a protective substrate for an optical disc of the CD standard is 1.2 mm.

A CD has been widely popularized as an optical information recording medium, and for the last few years, a DVD is popularized. The DVD is increased in its information recording capacity by making the thickness of the protective substrate thinner than the CD and also by miniaturizing the information recording hole. While a recording capacity of a CD is about 600 to 700 MB (Mega Bite), a DVD has a large recording capacity of about 4.7 GB (Giga Byte), thus being used a lot as a distribution medium to which a moving image such as a movie picture is recorded.

In addition, the optical pickup device for playing back the information from an optical disc of a DVD standard is principally the same as that of the CD. However, since the information recording hole is miniaturized as described above, the optical pickup device employs an objective lens having the NA of around 0.60, and a light source having the wavelength of around 655 nm. Further, as for the recording, ones having 0.65 in approximate is more often used. Herein, the thickness of the protective substrate for an optical disc of the DVD standard is 0.6 mm.

A recording type for the optical disc of the DVD standard is already put to practical use, and there are various standards such as DVD-RAM, DVD-RW/R, DVD+RW/R, and the like. The technical principal of these optical disc is also same as that of the CD standard.

As described above, there has been proposed an optical disc of high density/high capacity. This optical disc is to use the light source for providing the light having a wavelength of around 405 nm, which is the light source for providing so-called a blue-violet laser.

For such 'optical disc of high density', even if the wavelength to be used is determined, the thickness of the protective substrate, recording capacity, NA, and the like cannot be determined in a single uniform way.

If a way to improve the recording density substantially is selected, the thickness of the protective substrate of an optical disc is reduced, and accordingly the NA is increased. Alternatively, the thickness of the protective substrate and NA can be in the same standard as the conventional optical disc standard. At this time, the physical recording density is not significantly increased, but the properties required as the optical system become relatively gradual. In specific, there is proposed a protective substrate such as further reduced ones having the thickness of 0.1 mm, or ones same with DVD of 0.6 mm.

The optical component to be used in the above-described optical pickup device is mostly formed by an injection molding with a plastic resin or pressure molding with a glass. Of these, the glass-made optical component is generally small in the refractive-index variance to a temperature change. Therefore, this element can be used in a beam shaping prism disposed nearby a light source which is the heat source. However there is a problem that the manufacturing cost is high. Therefore, it is less employed in each of optical components of collimator, coupling lens, objective optical component, and the like. On the other hand, the plastic resin-made optical component has a merit that the manufacturing cost is low as it is molded by injection, and thus is used a lot to a large extent. However, since the plastic material has an absorption in the wavelength area to various degrees or another, there is a problem that the optical properties for a use are deteriorated.

Hence, in order to perform a playing back of information (reading) or recording of information at high speed, it is necessary to improve the light amount to surely form a spot of collected light. For this, a most simple method is to increase the light emitting amount of the diode by raising the power of a laser diode, but due to this if optical properties involved in the use are increasingly deteriorated, a problem arises in that the optical properties as designed cannot be attained. In addition, increase in an atmospheric temperature due to the raise of the laser power becomes a factor that promotes a deterioration of the resin.

Further, if the operation is carried out at high speed, the actuator also operates at high speed, and thus generated heat also becomes a factor that promotes a deterioration of the resin. Accordingly, there is proposed various efforts to control the change of the optical properties at the time of use.

For example, in Patent Document 1, there is disclosed a technique of blending 0.03 to 1 parts by mass of a hindered amine light-resistant stabilizer, 0.002 to 2 parts by mass of phenol antioxidant, and 0.002 to 1 parts by mass of phosphorous antioxidant, based on 100 parts by mass of a thermoplastic norbornene resin (for example, a hydroxide additive of ring-opening polymer of 1,4-methano-1,4,4a,9a-tetrahydrofluorene). However, the stability for light of a resin composition disclosed in Patent Document 1 is not sufficient, and thus is not appropriate to be used in an optical pickup device having the blue-violet laser light source. In addition, there is a flaw in transmittance that it is lowered due to a coloring as salt is formed by the phenol antioxidant and the hindered amine light-resistant stabilizer. There are also problems that the foaming at the time of molding is easy to occur, and since the birefringence is poor, an optical component of high density cannot be obtained.

Also, for example in Patent Document 2, there is disclosed a technique to obtain a resin composition excellent in a processing stability, light-resistant stability, heat resistance, and transparency, by containing a vinyl alicyclic hydrocarbon polymer and a hindered amine light-resistant stabilizer having the number average molecular weight (Mn) of 1,000 to 10,000. According to the method, the foaming at the time of molding and the birefringence are improved as compared to the above-described technique, but still the stability for light is insufficient, and thus is not appropriate to be used in an optical pickup device having the blue-violet laser light source. In addition, this method has a flaw in that white turbidity occurs due to the blue-violet laser light irradiation.

Further, in Patent Document 3, as the resin composition having excellent weather resistance, light resistance, transparency, heat resistance, and a low dusting characteristic at the time of molding process, and exhibiting excellent optical properties when molded to an optical component, there is disclosed a weather-resistant resin characterized by containing (A) a cyclic polyolefin-based resin, (B) benzotriazole-based UV absorbent having the molecular weight of 300 or more, the vapor pressure at 20° C. temperature of $1\times10^{-8}$ Pa or less, and the 5% weight reducing temperature with a heat loss measurement of 200° C. or above, and (C) a hindered amine light stabilizer having the molecular weight of 500 or more, the vapor pressure at 20° C. temperature of $1\times10^{-6}$ Pa or less, and the 5% weight reducing temperature with a heat loss measurement of 250° C. or above. According to the method, the heat resistance is improved and the foaming at the time of molding is controlled as in the above-described technique, but there is absorption with the benzotriazole ultraviolet absorber, and thus is not appropriate to be used in an optical pickup device having the blue-violet laser light source. In addition, there is a flaw that the water absorption is high.

In Patent Document 4, in order to obtain a molded product with no coloration and no color change although irradiated with UV ray for a long period, there is disclosed a technique of mixing pellet A formed from a resin composition containing 100 parts by mass of a vinyl alicyclic hydrocarbon polymer and 0.001 to 2.0 parts by mass of an antioxidant with pellet B formed from a resin composition containing 100 parts by mass of a vinyl alicyclic hydrocarbon polymer and 2 to 20 parts by mass of a light-resistant stabilizer at a ratio of 5≤A/B≤50 by mass, and then melt-molding the resultant. However, the stability at the time of molding is deteriorated, and the transparency of the resin and the stability for the light are both insufficient, thus is not appropriate to be practically used in an optical pickup device using the blue-violet laser light source. In addition, the method is inappropriate for a large-scale production as the manufacturing and molding processes are complicated.

In the Patent Document 5, there is disclosed a resin composition comprising a polymer (A) which is produced by subjecting an aromatic vinyl monomer to an addition polymerization reaction, and then hydrogenating an aromatic ring, and an antioxidant (B) having a phosphate ester structure and a phenol structure in a molecule such as 6-[3-(3-t-butyl-4-hydroxy-5-methylphenyl)propoxy]-2,4,8,10-tetrakis-t-butyldibenzo[d,f][1.3.2]dioxaphosphepin. It is described that the molded product of the resin composition is excellent in mechanical strength, and is not colored even with the irradiation of a light beam such as a blue-violet laser with a short wavelength and a high strength. However, the optical properties are still not sufficiently stable due to a deterioration of the resin during the use. Therefore, it is in fact difficult to use this resin composition in the optical pickup device having the blue-violet laser light source.

[Patent Document 1] Japanese Unexamined Patent Publication No. H09-268250

[Patent Document 2] WO 01/092412

[Patent Document 3] Japanese Unexamined Patent Publication No. 2001-72839

[Patent Document 4] Japanese Unexamined Patent Publication No. 2003-276047

[Patent Document 5] Japanese Unexamined Patent Publication No. 2004-83813

DISCLOSURE OF THE INVENTION

The molded products made of the molding materials used in the past did not completely solve the following problems.

i) Since the deterioration is easily generated when the laser light nearby the UV is used, the optical properties are changed during the use.

ii) Coloration occurred in a resin due to insufficient heat resistance at high temperature.

iii) Stability during the molding.

The invention is to provide a molding material, use thereof, and a process of producing the molding material capable of obtaining an optical component in which sufficient optical properties have, the deterioration is hardly generated although the laser light nearby the UV is used, and optical properties or light transmittance are maintained high during the use.

(1) A molding material including a polymer having a repeating structural unit whose part or whole contains an alicyclic structure, a phenolic stabilizer, a hindered amine light stabilizer, and a phosphorus stabilizer, in which at least a part of the phenolic stabilizer and/or hindered amine light stabilizer is presently adhering to the surface of particles of the above polymer.

(2) The molding material as set forth in (1), wherein the stabilizer adhered onto the surface of the particles is a phenolic stabilizer.

(3) The molding material as set forth in (1), wherein 20 to 100% by mass of the phenolic stabilizer is adhered onto the surface of the particles, based on 100% by mass of total amount of the phenolic stabilizer.

(4) The molding material as set forth in (1), wherein 90 to 100% by mass of the hindered amine light stabilizer is contained in the particles, based on 100% by mass of total amount of the hindered amine light stabilizer.

(5) The molding material as set forth in any one of (1) to (4), wherein 0.25 to 10 parts by mass of the hindered amine light stabilizer is contained in the particles, based on 100 parts by mass of the polymer.

(6) The molding material as set forth in any one of (1) to (5), wherein the phenolic stabilizer is adhered in a state of melting on the surface of the particles.

(7) The molding material as set forth in (6) obtained by heating the particles adhered with the phenolic stabilizer on the surface of the particles to a temperature in a range of $Tm_1-20°$ C. or higher to $Tm_2+20°$ C. or lower (where $Tm_1$ and $Tm_2$ represent the lower limit and the higher limit of the melting point of the phenolic stabilizer, respectively).

(8) The molding material as set forth in any one of (1) to (7), wherein the polymer is a cyclic olefin polymer having one kind or two or more kinds of structure(s) represented by general formula (1):

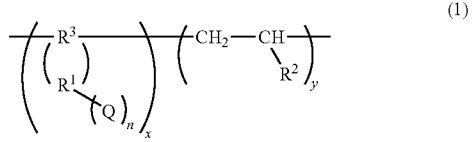

(1)

where x and y each represents a copolymerization ratio and is a real number satisfying $0/100 \leq y/x \leq 95/5$, and x and y being presented on a molar basis;

n represents a number of a substituent Q and is an integer satisfying $0 \leq n \leq 2$;

$R^1$ is a 2+n valent group selected from groups consisting of a hydrocarbon group having 2 to 20 carbon atoms;

$R^2$ is a hydrogen atom or a monovalent group selected from groups consisting of a hydrocarbon group having 1 to 10 carbon atoms;

$R^3$ is a 4 valent group selected from groups consisting of a hydrocarbon group having 2 to 10 carbon atoms;

Q is $COOR^4$ (where $R^4$ is a hydrogen atom or a monovalent group selected from groups consisting of a hydrocarbon group having 1 to 10 carbon atoms); and each of $R^1$, $R^2$, $R^3$, and Q is comprised of one group selected from the respective groups, or in the case of each of $R^1$, $R^2$, $R^3$, and Q is comprised of two or more groups selected from the respective groups, each of $R^1$, $R^2$, $R^3$, and Q is comprised of selected groups in arbitrary proportion.

(9) The molding material as set forth in any one of (1) to (7), wherein the polymer is a cyclic olefin-based polymer having one kind or two or more kinds of structure(s) represented by general formula (2) below:

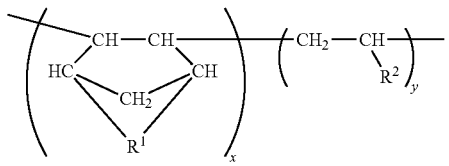

(2)

where $R^1$ is a divalent group selected from groups consisting of a hydrocarbon group having 2 to 20 carbon atoms;

$R^2$ is a hydrogen atom or a monovalent group selected from groups consisting of a hydrocarbon group having 1 to 10 carbon atoms;

each of $R^1$ and $R^2$ is comprised of one group selected from the respective groups, or in the case of each of $R^1$ and $R^2$ is comprised of two or more groups selected from the respective groups, each of $R^1$ and $R^2$ is comprised of selected groups in arbitrary proportion; and x and y each represents a copolymerization ratio and is a real number satisfying $5/95 \leq y/x \leq 95/5$. x and y are represented on a molar basis.

(10) The molding material as set forth in any one of (1) to (7), wherein the polymer is a copolymer of tetracyclo[4,4,0,$1^{2.5},1^{7.10}$]-3-dodecene and ethylene.

(11) A molded product obtained by melt molding the molding material as set forth in any one of (1) to (10).

(12) An optical component comprised of the molded product as set fourth in (11).

(13) The optical component as set forth in (12) used in an optical system having a light source of a wavelength of 300 nm to 450 nm.

(14) The optical component as set forth in (12), including an optical path difference-providing structure on an optical face.

(15) The optical component as set forth in any one of (12) to (14) used in the optical pickup device.

(16) The optical component as set forth in (15), wherein the optical component is used for an optical pickup device which employs a plurality of light sources of different wavelength and is capable of recording or playing back information on an optical information recording medium of various kinds having a different substrate thickness.

(17) The optical component as set forth in (16), wherein at least one of the light sources has a wavelength of 390 nm to 420 nm.

(18) An optical pickup device using the optical component as set forth in any one of (12) to (17).

(19) The optical pickup device as set forth in (18), wherein all or a part of the optical component as set forth in any one of (12) to (17) with held with an actuator to be movable.

(20) A process of using the molding material as set forth in any one of (1) to (10) as the optical component.

(21) A process of producing a molding material which includes a polymer having a repeating structural unit whose part or whole contains an alicyclic structure, a phenolic stabilizer, a hindered amine light stabilizer, and a phosphorus stabilizer, in which at least a part of the phenolic stabilizer and/or the hindered amine light stabilizer is adhered on surface of particles consisting of the polymer, the process including: producing particles containing the phenolic stabilizer and/or the hindered amine light stabilizer and comprising of the polymer including the phosphorus stabilizer: and adhering the phenolic stabilizer and/or the hindered amine light stabilizer on the surface of the particles.

(22) The process of producing the molding material as set forth in (21), wherein the adhering the stabilizer(s) includes adhering 20 to 100% by mass of phenolic stabilizer on the surface of the particles based on 100% by mass of total amount of the phenolic stabilizer included in the molding material.

(23) The process of producing the molding material as set forth in (22), the adhering the phenolic stabilizer on surface of the particles includes adhering in a state of melting said phenolic stabilizer on surface of the particles by heating the particles whose surface is adhered with the phenolic stabilizer to a temperature in a range of $Tm_1-20°$ C. or higher to $Tm_2+20°$ C. or lower (where $Tm_1$ and $Tm_2$ respectively represent lower limit and higher limit of a melting point of the phenolic stabilizer).

According to the molding material of the present invention, it becomes possible to obtain an optical component in which sufficient optical properties have, the deterioration is hardly generated although the laser light nearby the UV is used, and optical properties or light transmittance are maintained high during the use.

BRIEF DESCRIPTION OF THE DRAWINGS

The above-mentioned objects, other objects, characteristics, and advantages of the present invention will become apparent from preferred embodiments with reference to the following drawing.

FIG. 1 is a diagram of an optical pickup device relating to the present invention.

BEST MODE FOR CARRYING OUT THE INVENTION

Hereinafter, the present invention will be described in detail.

Polymer

A polymer used in a molding material of the present invention includes a repeating structural unit whose part or whole contains an alicyclic structure.

The polymer of the present invention is preferably selected from polymers represented by the following general formula (1).

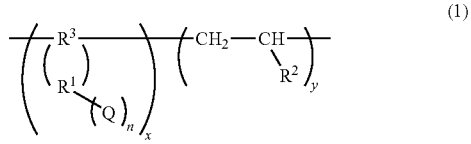
(1)

where x and y each represents a copolymerization ratio and is a real number satisfying $0/100 \leq y/x \leq 95/5$, and x and y being presented on a molar basis;

n represents a number of a substituent Q and is an integer satisfying $0 \leq n \leq 2$;

$R^1$ is a 2+n valent group selected from groups consisting of a hydrocarbon group having 2 to 20 carbon atoms;

$R^2$ is a hydrogen atom or a monovalent group selected from groups consisting of a hydrocarbon group having 1 to 10 carbon atoms;

$R^3$ is a 4 valent group selected from groups consisting of a hydrocarbon group having 2 to 10 carbon atoms; and Q is $COOR^4$ (where $R^4$ is a monovalent group selected from groups consisting of a hydrogen atom or a hydrocarbon group having 1 to 10 carbon atoms).

each of $R^1$, $R^2$, $R^3$, and Q is comprised of one group selected from the respective groups, or in the case of each of $R^1$, $R^2$, $R^3$, and Q is comprised of two or more groups selected from the respective groups, each of $R^1$, $R^2$, $R^3$, and Q is comprised of selected groups in arbitrary proportion.

Each of representations in general formula (1) satisfies preferred conditions described below and these conditions are used in combination if necessary.

[1] $R^1$ is group containing at least one ring structure.

[2] $R^3$ is an example of the structural unit including such $R^1$ group (when n=0) and exemplified by (a), (b), and (c);

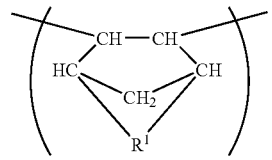
(a)

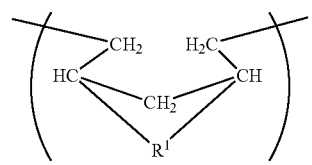
(b)

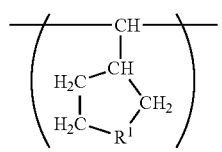
(c)

where $R^1$ is as described above.

[3] n is 0.

[4] y/x is a real number satisfying $5/95 \leq y/x \leq 95/5$.

[5] $R^2$ is a hydrogen atom and/or $-CH_3$.

[6] Q is $-COOH$ or $-COOCH_3$.

Among these, most preferably, each of representations in general formula (1) may include the following conditions and these conditions may be used in combination if necessary.

[1] $R^1$ group is a divalent group represented by general formula (3);

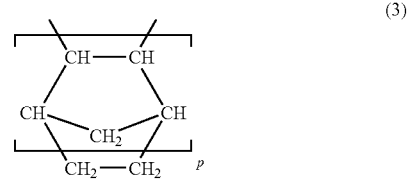
(3)

(where p is an integer of 0 to 2.)

Preferably, it is a divalent group represented by general formula (3) in which p is 1.

[2] $R^3$ group is an example of the structural unit including such R1 group (when n=0), which is the structure (a) exemplified above.

Types of polymerization are not particularly limited and various types of known polymerization such as addition polymerization, ring-opening polymerization, or the like may be used. Examples of the production by the addition polymerization include a random copolymer, a block copolymer, a alternating copolymer, and the like. In the present invention, the random copolymer is preferred from the viewpoint of inhibiting deterioration in optical properties.

When the structure of the resin which is the main component is as described above, optical properties such as transparency, refractive index, and birefringence becomes excellent and thus an optical component exhibiting high precision can be obtained.

(Example of Polymer Having a Repeating Structural Unit Whose a Part or all Contains an Alicyclic Structure)

Representative examples of the polymer represented by the general formula (1) include a polymer of four kinds (i) to (iv).

(i) copolymer of ethylene or α-olefin and cyclic olefin (ii) ring opening copolymer or hydrogen additives thereof (iii) polystyrene derivatives or hydrogen additives thereof (iv) other polymers Hereinafter, those examples will be described in order.

[(i) Copolymer of Ethylene or α-olefin and Cyclic Olefin]

(i) The copolymer of ethylene or α-olefin and cyclic olefin is a cyclic olefin copolymer represented by general formula (2). For example, it includes a structural unit (A) derived from ethylene or straight chain or branched chain α-olefin having 3 to 30 carbon atoms, and a structural unit (B) derived from cyclic olefin.

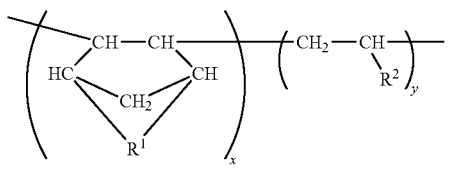

(2)

In general formula (2), $R^1$ is a divalent group selected from groups consisting of a hydrocarbon group having 2 to 20, preferably 2 to 12 carbon atoms.

$R^2$ is a hydrogen atom or a monovalent group selected from groups consisting of a hydrocarbon group having 1 to 10, preferably 1 to 5 carbon atoms.

each of $R^1$ and $R^2$ is comprised of one group selected from the respective groups, or in the case of each of $R^2$ and $R^2$ is comprised of two or more groups selected from the respective groups, each of $R^1$ and $R^2$ is comprised of selected groups in arbitrary proportion.

X and y each represent a copolymerization ratio and is a real number satisfying $5/95 \leq y/x \leq 95/5$, preferably $50/50 \leq y/x \leq 95/5$, more preferably $55/45 \leq y/x \leq 80/20$.

(Structural Unit (A) Derived from Ethylene or α-olefin)

The structural unit (A) derived from ethylene or α-olefin is a structural unit described below which is derived from ethylene or straight chain or branched chain α-olefin having 3 to 30 carbon atoms.

Specific examples thereof include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene. Among these, ethylene is preferred. The structural unit derived from ethylene or α-olefin may be used in combination of two or more within a scope of not disturbing the effect of the present invention.

(Structural Unit (B) Derived from Cyclic Olefin)

The structural unit (B) derived from cyclic olefin is composed of at least one selected from groups consisting of structural units derived from cyclic olefin represented by general formulas 4, 5, and 6.

The structural unit (B) derived from cyclic olefin represented by general formula (4) includes the following structures.

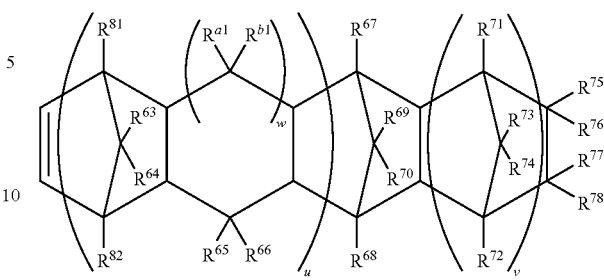

(4)

In general formula (4), u is 0 or 1, v is 0 or a positive integer, and w is 0 or 1. When w is 1, a ring represented by using w is a 6-membered ring, and when w is 0, this ring is a 5-membered ring. $R^{61}$ to $R^{78}$ and $R^{a1}$ and $R^{b1}$ are each independently a hydrogen atom, a halogen atom or a hydrocarbon group.

Examples of the halogen atom include a fluorine atom, a chlorine atom, a bromine atom, and an iodine atom. Examples of the hydrocarbon group generally include an alkyl group having 1 to 20 carbon atoms, a halogenated alkyl group having 1 to 20 carbon atoms, a cycloalkyl group having 3 to 15 carbon atoms, or an aromatic hydrocarbon group.

More specifically, examples of the alkyl group include methyl, ethyl, propyl, isopropyl, amyl, hexyl, octyl, decyl, dodecyl, and octadecyl. An example of the halogenated alkyl group can include a group in which the alkyl group having 1 to 20 carbon atoms is substituted with one halogen atom or a plurality of halogen atoms. Examples of the cycloalkyl group include cyclohexyl. Examples of the aromatic hydrocarbon group include phenyl and naphthyl.

In general formula (4), $R^{75}$ and $R^{76}$, $R^{77}$ and $R^{78}$, $R^{75}$ and $R^{77}$, $R^{76}$ and $R^{78}$, $R^{75}$ and $R^{78}$, or $R^{76}$ and $R^{77}$ may be linked together (namely, cooperate with each other) to form a monocyclic or polycyclic group, and the formed monocyclic or polycyclic group may have a double bond. Since it is possible to prepare a copolymer having a high glass transition temperature (Tg) out of the polycyclic group with a smaller content in comparison with the monocyclic group, the polycyclic group is preferred from the viewpoint of heat resistance. In addition, there is an advantage that it is possible to prepare the copolymer out of a cyclic olefin with a smaller content. Examples of the monocyclic or polycyclic group are given below.

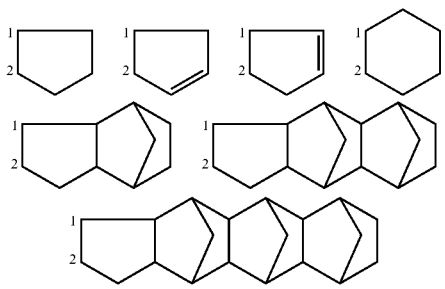

In these cyclic groups, the carbon atoms attached with numerals 1 and 2 are those to which $R^{75}$ ($R^{76}$) or $R^{77}$ ($R^{78}$) in general formula (4) is linked.

$R^{75}$ and $R^{76}$, or $R^{77}$ and $R^{78}$ may together form an alkylidene group. This alkylidene group generally has 2 to 20 carbon atoms, and examples of such alkylidene group include ethylidene group, propylidene group, and isopropylidene group.

The structural unit (B) derived from acyclic olefin represented by general formula (5) has the following structure.

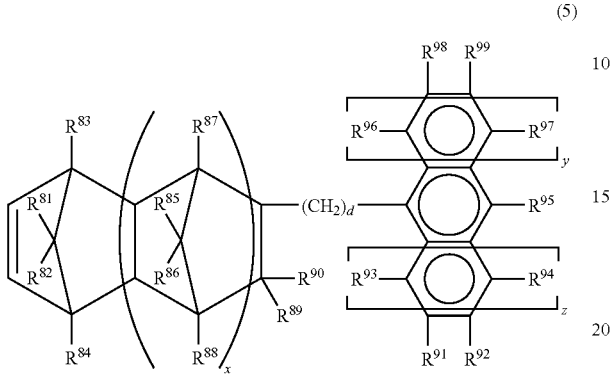

(5)

In general formula (5), each of x and d is independently 0 or a positive integer greater than 1, and each of y and z is independently 0, 1 or 2. Further, $R^{81}$ to $R^{99}$ are each independently a hydrogen atom, a halogen atom, an aliphatic hydrocarbon group, an alicyclic hydrocarbon group, an aromatic hydrocarbon group, or an alkoxy group; the carbon atom to which $R^{89}$ and $R^{90}$ are linked may be bonded directly or by way of an alkylene group having 1 to 3 carbon atoms to the carbon atom to which $R^{93}$ is linked or the carbon atom to which $R^{91}$ is linked. Furthermore, in the case of y=z=0, $R^{95}$ and $R^{92}$, or $R^{95}$ and $R^{99}$ may be linked together to form a monocyclic or polycyclic aromatic ring.

The halogen atom has the same meaning as in formula (4).

Examples of aliphatic hydrocarbon group include an alkyl group having 1 to 20 carbon atoms or a cycloalkyl group having 3 to 15 carbon atoms. Specifically, examples of the alkyl group include methyl, ethyl, propyl, isopropyl, amyl, hexyl, octyl, decyl, dodecyl and octadecyl. Examples of the cycloalkyl group include cyclohexyl.

Examples of aromatic hydrocarbon group include an aryl group and an aralkyl group. Specific examples include phenyl, tolyl, naphthyl, benzyl, and phenylethyl.

Examples of the alkoxy group include methoxy, ethoxy and propoxy. Further, here, the carbon atom to which $R^{89}$ and $R^{90}$ are linked may be bonded directly or by way of an alkylene group of 1 to 3 carbon atoms to the carbon atom to which $R^{93}$ is linked or the carbon atom to which $R^{91}$ is linked. That is, when the above two carbon atoms are linked by way of an alkylene group, $R^{89}$ and $R^{93}$, or $R^{90}$ and $R^{91}$ together (or cooperate with each other) to form alkylene group, such as methylene (—$CH_2$—), ethylene (—$CH_2CH_2$—) or propylene (—$CH_2CH_2CH_2$—).

Furthermore, in the case of y=z=0, $R^{95}$ and $R^{92}$, or $R^{95}$ and $R^{99}$ may be linked together to form a monocyclic or polycyclic aromatic ring. Examples of the aromatic ring which is formed from $R^{95}$ and $R^{92}$ in the case of y=z=0 are given below. Since it is possible to prepare a copolymer having a high glass transition temperature (Tg) out of the polycyclic group with a smaller content in comparison with the monocyclic group, the polycyclic group is preferred from the viewpoint of heat resistance. In addition, there is an advantage that it is possible to prepare the copolymer out of a cyclic olefin with a smaller content.

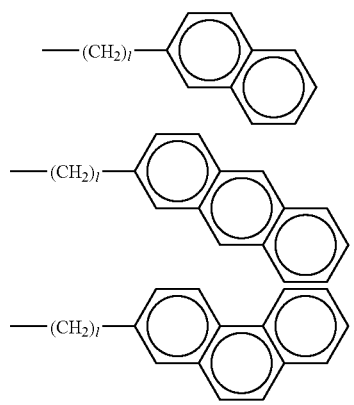

l is the same as d defined in the general formula (5).

The structural unit (B) derived from cyclic olefin represented by general formula (6) includes the following structure.

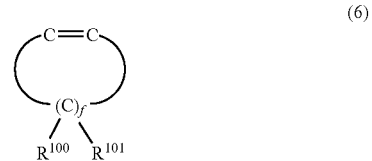

(6)

In general formula (6), $R^{100}$ and $R^{101}$ are independently a hydrogen atom or a hydrocarbon group having 1 to 5 carbon atoms, and f is an integer of 1 to 18. Preferred examples of the hydrocarbon group having 1 to 5 carbon atoms include an alkyl group, a halogenated alkyl group, or a cycloalkyl group. Specific examples thereof are apparent from the specific examples of $R^{61}$ to $R^{78}$ of the formula (4).

Specific examples of Structural unit (B) derived from a cyclic olefin represented by the above Formula (4), (5), or (6) include a bicyclo-2-heptene derivative (a bicyclohepto-2-ene derivative), a tricyclo-3-decene derivative, a tricyclo-3-undecene derivative, a tetracyclo-3-dodecene derivative, a pentacyclo-4-pentadecene derivative, a pentacyclopentadecadiene derivative, a pentacyclo-3-pentadecene derivative, a pentacyclo-4-hexadecene derivative, a pentacyclo-3-hexadecene derivative, a hexacyclo-4-heptadecene derivative, a heptacyclo-5-eicosene derivative, a heptacyclo-4-eicosene derivative, a heptacyclo-5-heneicosene derivative, a octacyclo-5-dococene derivative, a nonacyclo-5-pentacosene derivative, a nonacyclo-6-hexacosene derivative, a cyclopentadiene-acenaphtylene adduct, a 1,4-methano-1,4,4a,9a-tetrahydrofluorene derivative, a 1,4-methano-1,4,4a,5,10,10a-hexahydroanthracene derivative, a cycloalkylene derivative having 3 to 20 carbon atoms, and the like.

Among these, a tetracyclo[$4.4.0.1^{2,5}.1^{7,10}$]-3-dodecene derivative and a hexacyclo[$6.6.1.1^{3,6}.1^{10,13}.0^{2,7}.0^{9,14}$]-4-heptadecene derivative are preferable, and a tetracyclo[$4.4.0.1^{2,5}.1^{7,10}$]-3-dodecene derivative is particularly preferable.

The structural unit (B) derived from a cyclic olefin represented by the above Formula (4) or (5) can be produced by reacting cyclopentadiene with an olefin having a corresponding structure under a Diels-Alder reaction. The structural unit (B) derived from a cyclic olefin represented by the above Formula (4), (5), or (6) may be included in two or more kinds. Additionally, ones polymerized using the above monomer can be modified according to its necessity, and in such case, a structure of the structural unit derived from the monomer can be modified. For example, according to a hydrogenation treatment, a benzene ring in the structural unit derived from the monomer can be modified a cyclohexyl ring under specific condition.

In the present invention, as '(i) copolymer of ethylene or α-olefin and cyclic olefin', a copolymer of ethylene and a tetracyclo[4.4.0.1$^{2,5}$.1$^{7,10}$]-3-dodecene is preferable.

The type of copolymerization in the present invention is not at all limited, and well-known various copolymerization types such as a random copolymer, a block copolymer, an alternating copolymerization, and the like, can be employed, but preferably is a random copolymer.

[(ii) Ring-Opening Polymer or Hydrogenated Product Thereof]

(ii) The ring-opening polymer or hydrogenated product thereof is a cyclic olefin polymer having the structural unit represented by the exemplary structure (b) among the structures mentioned as the preferable examples of Formula (1).

The cyclic olefin polymer may have a polar group. Examples of the polar group include a hydroxyl group, a carboxyl group, an alkoxy group, an epoxy group, a glycidyl group, an oxycarbonyl group, a carbonyl group, an amino group, an ester group, and the like.

The cyclic olefin polymer is generally obtained by polymerizing a cyclic olefin, specifically by ring-opening polymerizing an alicyclic olefin, and for example, the cyclic olefin polymer having a polar group is obtained by introducing a compound having a polar group in the cyclic olefin polymer by a degeneration reaction, or copolymerizing a monomer including a polar group as the copolymer component.

Specific examples of the alicyclic olefin used to obtain the cyclic olefin polymer includes: a norbornene monomer such as bicyclo[2.2.1]-hepto-2-ene (the trivial name: norbornene), 5-methyl-bicyclo[2.2.1]-hepto-2-ene, 5,5-dimethyl-bicyclo[2.2.1]-hepto-2-ene, 5-ethyl-bicyclo[2.2.1]-hepto-2-ene, 5-butyl-bicyclo[2.2.1]-hepto-2-ene, 5-hexyl-bicyclo[2.2.1]-hepto-2-ene, 5-octyl-bicyclo[2.2.1]-hepto-2-ene, 5-octadecyl-bicyclo[2.2.1]-hepto-2-ene, 5-ethylidene-bicyclo[2.2.1]-hepto-2-ene, 5-methylidene-bicyclo[2.2.1]-hepto-2-ene, 5-vinyl-bicyclo[2.2.1]-hepto-2-ene, 5-propenyl-bicyclo[2.2.1]-hepto-2-ene, 5-methoxy-carbinyl-bicyclo[2.2.1]-hepto-2-ene, 5-cyano-bicyclo[2.2.1]-hepto-2-ene, 5-methyl-5-methoxycarbonyl-bicyclo[2.2.1]-hepto-2-ene, 5-ethoxycarbonyl-bicyclo[2.2.1]-hepto-2-ene, bicyclo[2.2.1]-hepto-5-enyl-2-methylpropionate, bicyclo[2.2.1]-hepto-5-enyl-2-methyloctanate, bicyclo[2.2.1]-hepto-2-ene-5,6-dicarboxylic acid anhydride, 5-hydroxymethylbicyclo[2.2.1]-hepto-2-ene, 5,6-di(hydroxymethyl)-bicyclo[2.2.1]-hepto-2-ene, 5-hydroxy-1-propylbicyclo[2.2.1]-hepto-2-ene, 5,6-dicarboxy-bicyclo[2.2.1]-hepto-2-ene, bicyclo[2.2.1]-hepto-2-ene-5,6-dicarboxylic acid imide, 5-cyclopentyl-bicyclo[2.2.1]-hepto-2-ene, 5-cyclohexyl-bicyclo[2.2.1]-hepto-2-ene, 5-cyclohexenyl-bicyclo[2.2.1]-hepto-2-ene, 5-phenyl-bicyclo[2.2.1]-hepto-2-ene, tricyclo[4.3.0.1$^{2.5}$]deca-3,7-diene (the trivial name: dicyclopentadiene), tricyclo[4.3.0.1$^{2.5}$]deca-3-ene, tricyclo[4.4.0.1$^{2.5}$]undeca-3,7-diene, tricyclo[4.4.0.1$^{2.5}$]undeca-3,8-diene, tricyclo[4.4.0.1$^{2.5}$]undeca-3-ene, tetracyclo[7.4.0.1$^{10,13}$.0$^{2,7}$]-trideca-2,4,6-11-tetraene (the trivial name: 1,4-methano-1,4,4a,9a-tetrahydrofluorene), tetracyclo[8.4.0.1$^{11,14}$.0$^{3,8}$]-tetradeca-3,5,7,12-11-tetraene (the trivial name: 1,4-methano-1,4,4a,5,10,10a-hexahydroanthracene), tetracyclo[4.4.0.1$^{2,5}$.1$^{7,10}$]-dodeca-3-ene (the trivial name: tetracyclododecene), 8-methyl-tetracyclo[4.4.0.1$^{2,5}$.1$^{7,10}$]-dodeca-3-ene, 8-ethyl-tetracyclo[4.4.0.1$^{2,5}$.1$^{7,10}$]-dodeca-3-ene, 8-methylidene-tetracyclo[4.4.0.1$^{2,5}$.1$^{7,10}$]-dodeca-3-ene, 8-ethylidene-tetracyclo[4.4.0.1$^{2,5}$.1$^{7,10}$]-dodeca-3-ene, 8-vinyl-tetracyclo[4.4.0.1$^{2,5}$.1$^{7,10}$]-dodeca-3-ene, 8-propenyl-tetracyclo[4.4.0.1$^{2,5}$.1$^{7,10}$]-dodeca-3-ene, 8-methoxycarbonyl-tetracyclo[4.4.0.1$^{2,5}$.1$^{7,10}$]-dodeca-3-ene, 8-methyl-8-methoxycarbonyl-tetracyclo[4.4.0.1$^{2,5}$.1$^{7,10}$]-dodeca-3-ene, 8-hydroxymethyl-tetracyclo[4.4.0.1$^{2,5}$.1$^{7,10}$]-dodeca-3-ene, 8-carboxy-tetracyclo[4.4.0.1$^{2,5}$.1$^{7,10}$]-dodeca-3-ene, 8-cyclopentyl-tetracyclo[4.4.0.1$^{2,5}$.1$^{7,10}$]-dodeca-3-ene, 8-cyclohexyl-tetracyclo[4.4.0.1$^{2.5}$.1$^{7,10}$]-dodeca-3-ene, 8-cyclohexenyl-tetracyclo[4.4.0.1$^{2,5}$.1$^{7.10}$]-dodeca-3-ene, 8-phenyl-tetracyclo[4.4.0.1$^{2,5}$.1$^{7,10}$]-dodeca-3-ene, pentacyclo[6.5.1.1$^{3,6}$.0$^{2,7}$.0$^{9,13}$]pentadeca-3,10-diene, and pentacyclo[7.4.0.1$^{3,6}$.1$^{10,13}$.0$^{2,7}$]-pentadeca-4,11-diene;

a mono-cycloalkene such as cyclobutene, cyclopentene, cyclohexene, 3,4-dimethylcyclopentene, 3-methylcyclohexene, 2-(2-methylbuthyl)-1-cyclohexene, cyclooctene, 3a,5,6,7a-tetrahydro-4,7-methano-1H-indene, and cycloheptene; a vinyl alicyclic hydrocarbon monomer such as vinyl cyclohexene and vinyl cyclohexane; and an alicyclic conjugated diene monomer such as cyclopentadiene, cyclohexadiene. The alicyclic olefin may be used each independently or in combination of two or more kinds.

Additionally, a copolymerizable monomer can be copolymerized according to its necessity. Specific examples thereof include ethylene or α-olefin having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and the like; a cycloolefin such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene; and a nonconjugated diene such as 1,4-hexadiene, 4-methyl-1,4-hexadiene, 5-methyl-1,4-hexadiene, 1,7-octadiene. These monomers can be used each independently or in combination of two or more kinds.

A polymerization method of alicyclic olefin is not particularly limited and can be carried out in accordance with a well-known method. These ring-opening polymerization products are preferably hydrogenated for being used, considering the heat resistance, the stability, and the optical properties. As for the hydrogenation method, well-known methods can be used.

[(iii) Polystyrene Derivative or Hydrogenated Product Thereof]

The polystyrene derivative or the hydrogenated product thereof is a (co)polymer or a hydrogenated product thereof capable of obtaining a vinyl compound as a monomer and is a cyclic olefin-based polymer having the structural unit represented by the exemplary structure (c) among the structures mentioned as the preferable examples of Formula (1). Examples of the vinyl compound include a vinyl aromatic compound, vinyl alicyclic hydrocarbon compound.

Examples of the vinyl aromatic compound include styrenes such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene 4-phenylstyrene, and the like.

Examples of the vinyl alicyclic hydrocarbon compound include vinylcyclohexane such as vinylcyclohexane, 3-methylisopropenylcyclohexane, and the like; and vinylcyclohexene such as 4-vinylcyclohexene, 4-isopropenylcyclohexene, 1-methyl-4-vinylcyclohexene, 1-methyl-4-isopropenylcyclohexene, 2-methyl-4-vinylcyclohexene, 2-methyl-4-isopropenylcyclohexene.

In the present invention, above monomer and the other copolymerizable monomer may be copolymerized. Specific examples of the copolymerizable monomer include: α-olefin monomers such as ethylene, propylene, isobutene, 2-methyl-1-butene, 2-methyl-1-pentene, 4-methyl-1-pentene, and the like; cyclopentadiene monomers such as cyclopentadiene, 1-methylcyclopentadiene, 2-methylcyclopentadiene, 2-ethylcyclopentadiene, 5-methylcyclopentadiene, 5,5-dimethylcyclopentadiene, dicyclopentadiene, and the like;

monocyclic olefin monomers such as cyclobutene, cyclopentene, cyclohexene, and the like; conjugated diene monomers such as butadiene, isoprene, 1,3-pentadiene, furane, thiophene, 1,3-cyclohexadiene, and the like;

nitrile monomers such as acrylonitrile, methacrylonitrile, α-chloroacrylonitrile, and the like; (meth)acrylate ester monomers such as methyl methacrylate, ethyl methacrylate, propyl methacrylate, butyl methacrylate, methyl acrylate, ethyl acrylate, propyl acrylate, butyl acrylate; unsaturated fatty acid monomers such as acrylic acid, methacrylic acid, maleic acid anhydride; phenylmaleimide; methylvinylether; and heterocyclic ring-containing vinyl compound monomers such as N-vinylcarbazole and N-vinyl-2-pyrrolidone.

From the viewpoints of heat resistance, low birefringence, and mechanical strength, the mixture of above monomer used in polymerization contains generally a vinyl aromatic compound and/or a vinyl alicyclic hydrocarbon compound in the amount of 50% by mass or more, preferably from 70 to 100% by mass, even more preferably from 80 to 100% by mass. The monomer mixture may contain both the vinyl aromatic compound and the vinyl alicyclic hydrocarbon compound.

A polymerization method of vinyl aromatic compound and a vinyl alicyclic hydrocarbon compound is not particularly limited and can be carried out in accordance with a well-known method. The polymers thus obtained are preferably hydrogenated for being used. As for the hydrogenation method, well-known methods can be used.

[(iv) Other Polymer]

Examples of the other polymer include a ring-opening polymer of a norbornene monomer, an addition polymer of a norbornene monomer, an addition polymer of a norbornene monomer with a vinyl compound (such as ethylene or α-olefin), a polymer of monocyclic cycloalkene, a polymer of alicyclic conjugated diene monomer, a polymer of vinyl alicyclic hydrocarbon monomer, an aromatic olefin polymer, and the like, but the structure which is not contained in the above (i) to (iii) may also be optionally selected within the range of Formula (1). Examples include the ones interrelated to (i) to (iii), or copolymerized with a well-known copolymerizable monomer.

Among the four kinds of polymers classified into the above mentioned (i) to (iv), (i) the copolymer of ethylene or α-olefin, and cyclic olefin is preferable, and a polymer obtained by random additional polymerization of ethylene and tetracyclo[4.4.0.1$^{2,5}$.1$^{7,10}$]-3-dodecene is most preferable, from the viewpoint of optical properties. In such a structural range of the present invention, a plastic having low optical anisotropy which results from a distortion during the molding and which is an excellent property of the polymer according to the present invention is obtained, thereby not causing a deterioration in optical property. That is, a plastic having low optical anisotropy and having property such as low absorption ratio and excellent heat resistance and chemical resistance can be obtained.

(Other Structure Capable of being a Part of a Main Chain)

The polymer used in the present invention may have a repeating structural unit derived from the other copolymerizable monomer within the range of not inhibiting the preferred properties of the product obtained by the molding method of the present invention, according to its necessity. The copolymerization ratio is not limited, but preferably is 20 mol % or less and more preferably 10 mol % or less. When the copolymerization amount is more than 20 mol %, the optical properties are impaired so that a high precision optical component may not be obtained. In addition, the kind of copolymerization is not limited, but random copolymer is preferred.

(Molecular Weight of Polymer)

The molecular weight of polymer used in the molding material of the present invention is not limited, but the limiting viscosity [η] measured in the decalin at 135° C. is preferably from 0.03 to 10 dl/g, more preferably from 0.05 to 5 dl/g, most preferably from 0.1 to 2 dl/g.

The moldability deteriorates when the molecular weight is above the range. The molded product is brittle when the molecular weight is below the range.

Hindered Amine Light Stabilizers

A hindered amine light stabilizer used in the present invention is a compound which has 3,5-di-t-butyl-4-hydroxyphenyl group, and 2,2,6,6-tetramethylpiperidine group or 1,2,2,6,6-pentamethyl-4-piperidyl group in a structure in general and specific examples thereof include: 2,2,6,6-tetramethyl-4-piperidyl stearate, 1,2,2,6,6-pentamethyl-4-piperidyl stearate, 2,2,6,6-tetramethyl-4-piperidyl benzoate, N-(2,2,6,6-tetramethyl-4-piperidyl)dodecylsuccinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl) propionate, bis(1,2,2,6,6-pentamethyl-4-piperidyl)cebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetrakis(2,2,6,6-tetramethyl-4-piperidyl)-1,2,3,4,-butane tetracarboxylate, tetrakis(1,2,2,6,6-pentamethyl-4-piperidyl)-1,2,3,4-butane tetracarboxylate, bis(2,2,6,6-tetramethyl-4-piperidyl)di(tridecyl)-1,2,3,4-butane tetracarboxylate, bis(1,2,2,6,6-pentamethyl-4-piperidyl)di(tridecyl)-1,2,3,4-butane tetracarboxylate, 3,9-bis[1,1-dimethyl-2-{tris(2,2,6,6-tetramethyl-4-piperidyloxycarbonyloxy)-butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[4,6-bis{N-(2,2,6,6-tetramethyl-4-piperidyl)butylamino}-1,3,5-triazin-2-yl]-1,5,8,12-tetraazadodecane, a condensation product of 1-(2-hydroxyethyl)-2,2,6,6-tetramethyl-4-piperidinol/dimethyl succinate, a condensation product of 2-tert-octylamino-4,6-dichloro-s-triazine/N,N'-bis(2,2,6,6-tetramethyl-4-piperidyl)hexamethylenediamine, a condensation product of N,N'-bis(2,2,6,6-tetramethyl-4-piperidyl)-hexamethylenediamine/dibromoethane, 2,2,6,6-tetramethyl-4-hydroxypiperidin-N-oxy, bis(2,2,6,6-tetramethyl-N-oxylpiperidine)sebacate, tetrakis(2,2,6,6-tetramethyl-N-oxylpiperidyl)butane-1,2,3,4-tetracarboxylate, 3,9-bis(1,1-dimethyl-2-(tris(2,2,6,6-tetramethyl-N-oxylpiperidyl-4-oxycarbonyl) butylcarbonyloxy)ethyl)-2,4,8,10-tetraoxaspiro[5.5] undecane, a polycondensation product of 1,6-bis(2,2,6,6-tetramethyl-4-piperidylamino)-hexane/dibromoethane, a polycondensation product of 1,6-bis(2,2,6,6-tetramethyl-4-piperidylamino)hexane/2,4-dichloro-6-tertoctylamino-s-triazine, a polycondensation product of 1,6-bis(2,2,6,6-tetramethyl-4-piperidylamino)hexane/2,4-dichloro-6-morpholino-s-triazine, a condensation of 2,2,6,6-tetramethyl-4- piperidinol and tridecyl alcohol and 1,2,3,4-butane tetracarboxylic acid, a condensation of 2,2,6,6-tetramethyl-4-piperidinol and 1,2,3,4-butane tetracarboxylic acid, a condensation of 1,2,2,6,6-pentamethyl-4-piperidinol and tridecyl alcohol and 1,2,3,4-butane tetracarboxylic acid, a condensation of 1,2,2,6,6-tetramethyl-4-piperidinol and 1,2,3,4-butane tetracarboxylic acid, 1-[2-(3-(3,5-di-t-butyl-4-hydroxyphenyl)propionyloxy)ethyl]-4-(3,3,5-di-t-butyl-4-hydroxyphenyl)propionyloxy]-2,2,6,6-tetramethylpiperidine (for example, Sanol LS-2626, manufactured by Sankyo Co., Ltd.), 2-(3,5-di-t-butyl-4-hydroxybenzyl)-2-n-butylmalonate-bis-(1,2,2,6,6-pentamethyl-4-piperidyl) (for example, Tinuvin 144, manufactured by Chiba-Geigy Japan Co., Ltd.), bis(2,2',6,6'-tetramethyl-4-piperidyl)sebacate (for example, TINUVIN 770, manufactured by Chiba-Geigy Japan Co., Ltd.), and poly[6-(1,1,3,3-tetramethylbutyl)imino-1,3,5-triazine-2,4-diyl][(2,2,6,6-tetramethyl-4-piperidyl)-imino] hexamethylene[(2,2,6,6-tetramethyl-4-piperidyl)imino], (For emxaple, CHIMASSORB 944, manufactured by Chiba-Geigy Japan Co., Ltd.)

Phenolic Stabilizer

A phenolic stabilizer used in the present invention is a stabilizer which has a phenol skeleton in its structure. The phenolic stabilizer includes characteristic groups such as a 3,5-dimethyl-4-hydroxyphenyl group, a 2,4-dimethyl-3-hydroxyphenyl group, a 3-methyl-2-hydroxyphenyl group, and derivatives thereof in a structure. For example, following specific groups are contained.

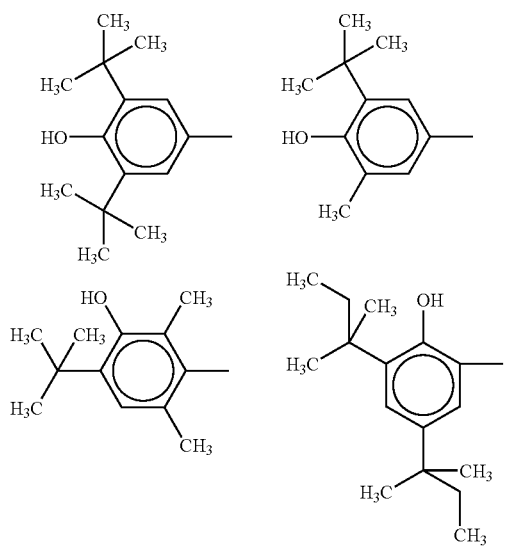

Specific examples thereof include 1,6-hexanediol-bis[3-(3,5-di-t-butyl-4-hydroxyphenyl)propionate], pentaerythrityl-tetrakis[3-(3,5-di-t-butyl-4-hydroxyphenyl)propionate), octadecyl-3-(3,5-di-t-butyl-4-hydroxyphenyl)propionate, 1,3,5-trimethyl-2,4,6-tris(3,5-di-t-butyl-4-hydroxybenzyl) benzene, tetrakis[methylene-3-(3,5-di-t-butyl-4-hydroxyphenyl)propionate]methane, and the like; and a hindered phenolic antioxidant such as commercially available ADECASTAB AO-20, ADECASTAB AO-60, ADECASTAB AO-80, and ADECASTAB AO-330 (the above four kinds are manufactured by Asahi Denka Co., Ltd.), or Irganox 1010 (manufactured by Chiba-Geigy Japan Co., Ltd.). Other than this, one classified into a phosphorus stabilizer, such as an antioxidant having the structure of phosphate ester and phenol in one molecule, for example, 6-[3-(3-t-butyl-4-hydroxy-5-methylphenyl)propoxy]-2,4,8,10-tetrakis-t-butyldibenzo [d,f][1,3,2]dioxaphosphin, is included.

A melting point range of the phenolic stabilizer ($Tm_1$ (lower limit, scale; ° C.) to $Tm_2$ (upper limit, scale; ° C.)) can be measured by the known methods. For example, a test piece is taken out with a thickness of 2 to 3 mm by the use of a capillary and then heated in a solution. Here, a melting start temperature of the test piece is $Tm_1$ (lower limit, scale; ° C.) and a melting end temperature of the test piece is $Tm_2$ (upper limit, scale; ° C.). The melting point range is not limited, but the lower limit ($Tm_1$) of the melting point is preferably 50° C. or higher, more preferably 100° C. or higher and the upper limit ($Tm_2$) of the melting point is preferably 150° C. or lower, more preferably 140° C. or lower. Furthermore, the melting point range ($Tm_2$ to $Tm_1$) is preferably 20° C. or lower, more preferably 10° C. or lower.

When the melting point and the width of the melting point is within the above-mentioned range, the phenolic stabilizer is prevented from removing from the surface of the resin particle by melting at the process such as a drying process before the molding process. Then, since the phenolic stabilizer is melted earlier than the resin is melted when the resin is fed into the molding machine, the phenolic stabilizer is homogeneously dispersed into the resin in the molding machine. Thereby, a homogeneous molded product is obtained.

Phosphorus Stabilizer

The phosphorus stabilizer used in the present invention includes tris(2,4-di-t-butylphenyl)phosphate, tetrakis(2,4-di-t-butylphenyl)-4,4'-biphenylenediphosphite, bis(2,6-di-t-butyl-4-methylphenyl)pentaerythritol-di-phosphite, bis(2,4-di-t-butyl)pentaerythritol-di-phosphite, 2,2'-methylenebis(4,6-di-t-butylphenyl)octylphosphite, 2,2-ethylenebis(4,6-di-t-butylphenyl)fluorophosphonite, tris(monononylphenyl) phosphate, and tris[2-[[2,4,8,10-tetra-t-butyldibenzo[d,f][1,3,2]dioxaphosphefin-6-yl]oxy]ethyl]amine and the like and a compound having the structure of phosphate ester and phenol in one molecule such as 6-[3-(3-t-butyl-4-hydroxy-5-methylphenyl)propoxy]-2,4,8,10-tetrakis-t-butylbenzo[d,f][1,3,2]dioxaphosphepine, is included.

In order to prevent the stabilizers used in the present invention from being foamed at the time of molding and being vappored from the surface of the molded product at a high temperature, it is preferable that the stabilizers have a vapor pressure of $10^{-6}$ Pa or less at 20° C. The above exemplified phenolic stabilizer and the phosphorus stabilizer both have a vapor pressure of preferably $10^{-6}$ Pa or less.

Resin Composition

A resin composition used to produce a molding material of the present invention includes preferably a hindered amine light stabilizer of 0.25 to 10 parts by mass, preferably 0.3 to 5 parts by mass, more preferably 0.5 to 3 parts by mass; a phenolic stabilizer of 0.01 to 10 parts by mass, preferably 0.02 to 2 parts by mass, more preferably 0.05 to 2 parts by mass; and a phosphorus stabilizer of 0.01 to 5 parts by mass, preferably 0.02 to 2 parts by mass, more preferably 0.05 to 1 parts by mass, based on 100 parts by mass of polymer. When a too small amount of hindered amine light stabilizer is included, light resistance, weathering resistance, and heat resistance are not sufficient. On the other hand, when a too large amount of hindered amine light stabilizer is included, bleeding occurs and thus deterioration in appearance occurs. When a too small amount of phenolic stabilizer is included, weathering resistance and heat resistance are also not sufficient. On the other hand, when a too large amount of phenolic stabilizer is included, coloration occurs. When a too small amount of phosphorous stabilizer is included, white turbidity occurs in the composition, thereby causing insufficient transparency. On the other hand, when a too large amount of phosphorous stabilizer is included, bleeding occurs, thereby causing deterioration in appearance. That is, when the blending amounts of the stabilizers are in the ranges, a balance between those characteristics is improved.

A method of blending the hindered amine light stabilizer, the phenolic stabilizer, the phosphorous stabilizer, and additives which may be additionally blended depending on usage purposes in the polymer is not limited. Those may be blended with the polymer or be blended in a polymer solution and then a solvent may be removed therefrom. Alternatively, those may be extracted in a hollow solvent.

Other Additives

In the molding material of the present invention, other additives may be blended within the scope of not disturbing the effect of the present invention. For example, various kids of additives such as ultraviolet absorbers; anti-static agents of amine type or the like; and lubricants such as esters of aliphatic alcohols, and partial esters or partial ethers of polyhydric alcohols may be added. Furthermore, resins such as ethylene polymers or rubber-like polymers may be added depending on the object as far as the characteristics of the hydrogenation product are not lost.

In the present invention, the ultraviolet absorbers are preferably added, and particularly, benzotriazole-based ultraviolet absorbers and/or benzophenone-based ultraviolets absorber and used.

Specific examples of the benzotriazole-based ultraviolet absorbers include 2-(5-methyl-2-hydroxyphenyl)benzotriazole, 2,2-hydroxy-3,5-bis(α,α-dimethylbenzyl)phenyl, 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-4'-n-octoxyphenyl)benzotriazole; benzotriazole derivatives such as Tinuvin 328 and Tinuvin PS (both manufactured by Chiba-Geigy Co., Ltd.), and SEESORB709 (2-2'-hydroxy-5'-t-octylphenyl)benzotriazole, Shiraishi Calcium Kaisha, LTD.) which are commercially available.

Specific examples of benzophenone-based ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4,-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-5-sulfobenzophenone trihydrate, 2-hydroxy-4-n-octoxy benzophenone, 2-hydroxy-4-octadecyloxy benzophenone, 2-hydroxy-4-n-dodecyloxy benzophenone, 2-hydroxy-4-benzyloxybenzophenone, 2,2',4,4'-tetrahydroxy benzophenone, 2-hydroxy-4-dodecyloxy benzophenone, 2-hydroxy-4-(2-hydroxy-3-methacryloxy)propoxy benzophenone, Uvinul 490 (a mixture of 2,2'-dihydroxy-4,4'-dimethoxy benzophenone and other tetra-substituted benzophenone, manufactured by GAF Corporation), and PermylB-100 (benzophenone compound, manufactured by Ferro Corporation).

The ultraviolet absorbers are added in the amount of preferably 0.005 parts by mass or more, more preferably 0.01 parts by mass or more, particularly preferably, 0.02 parts by mass or more, and preferably 1 parts by mass or less, more preferably 0.7 parts by mass or less, particularly preferably 0.5 parts by mass or less, based on 100 parts by mass of the polymer of the present invention. When a small amount of the ultraviolet absorbers are added, light resistance and weathering resistance are not sufficient, and when a large amount is added, coloration occurs in the molded product. That is, when the absorbers are added in such an amount, light resistance and weathering resistance becomes excellent, thereby inhibiting coloration in the molded product.

Examples of the lubricants include compounds having a partial ester structure of polyalcohols known in JP-A-63-273666, such as glycerin monostearate, glycerin monolaurate, glycerin distearate, pentaerythritol monostearate, pentaerythritol distearate and pentaerythritol tristearate; compounds having a partial ether structure of polyalcohols, such as 3-(4-nonylphenyloxy)-1,2-propanediol known in JP-A-3-39403, 3-(behenyloxy)-1,2-propanediol and 2,2-bis[4-(2,3-dihydroxypropyloxy)phenyl]propane; compounds having an ester-bonded structure of OH-containing saturated fatty acid and all OH groups in alcohols such as 12-hydroxy stearate triglyceride, 12-hydroxystearate alcohol stearyl, pentaerythritol-tetra-12-hydroxystearate, ethyleneglycol-di-12-hydroxystearate, and propyleneglycol-di-12-hydroxy stearate; and compounds having an ester-bonded structure of OH-containing saturated fatty acid and part groups in alcohols such as monoglyceride 12-hydroxystearate.

Molding Material

A molding material of the present invention includes a polymer having a repeating structural unit whose part or whole contains an alicyclic structure, a phenolic stabilizer, a hindered amine light stabilizer, and a phosphorus stabilizer, in which at least a part of the phenolic stabilizer and/or hindered amine light stabilizer is presently adhering to the surface of particles of the above polymer.

Since the molding material of the present invention includes such a configuration, it is possible to obtain an optical component in which sufficient optical properties have, the deterioration is hardly generated although the laser light nearby the UV is used, change in the optical properties during the use are small, and the light transmittance is maintained high. According to the molding material of the present invention, particles include 'a polymer having a repeating structural unit whose part or whole contains an alicyclic structure' and the phenolic stabilizer and the hindered amine stabilizer are presented inside the particles or on the surface of the practices in an amount not exceeding a certain range, an optical component in which the deterioration is hardly generated during the use under condition of high temperature can be obtained. Furthermore, in the molding material of the present invention, since the stabilizers adhered on the surface of the particles serve as a lubricant, moldabilizer becomes stable and thus the molding material is suitable for a mass production of an optical component.

In the molding material of the present invention, the phenolic stabilizer is adhered on the surface of the particles in an amount of 20% by mass to 100% by mass, preferably 30% by mass to 100% by mass, and particularly preferably 90% by mass to 100% by mass, based on 100% by mass of a total amount of the phenolic stabilizer contained in the molding material. In addition, the hindered amine light stabilizer is included in the particles in an amount of 90% by mass to 100% by mass, preferably 100% by mass, based on 100% by mass of a total amount of the hindered amine light stabilizer contained in the molding material. A part of the hindered amine light stabilizer may be adhered on the surface of the particles and residuals may be included in the particles.

Since the phenolic stabilizer and the hindered amine light stabilizer are contained in such a range, a coexistent amount of the phenolic stabilizer and the hindered amine light stabilizer becomes smaller than a certain amount. For this reason, a reaction between the phenolic stabilizer and the hindered amine light stabilizer is inhibited, and thus an effect on transmittance of a light ray caused by coloration is avoided.

The molding material of the present invention preferably includes the hindered amine light stabilizer in an amount of 0.25 to 10 parts by mass, preferably 0.3 to 5 parts by mass, more preferably 0.5 to 3 parts by mass; the phenolic stabilizer in an amount of 0.01 to 10 parts by mass, preferably 0.02 to 2 parts by mass, more preferably 0.05 to 2 parts by mass; and the phosphorous stabilizer in an amount of 0.01 to 5 parts by mass, preferably 0.02 to 2 parts by mass, more preferably 0.05 to 1 parts by mass, based on 100 parts by mass of the polymer. In addition, when both the hindered amine light stabilizer and the phenolic stabilizer are coexisted, those may be reacted to produce salts. However, when included in such an amount, other stabilizers used for producing the salts may be also included.

When a too small amount of hindered amine light stabilizer is included, light resistance, weathering resistance, and heat resistance are not sufficient but when a too large amount of hindered amine light stabilizer is included, bleeding occurs, thereby causing deterioration in appearance. When a too small amount of phenolic stabilizer is included, weathering resistance and heat resistance are also not sufficient, but when a too large amount of phenolic stabilizer is included, coloration occurs. When a too small amount of phosphorous stabilizer is included, white turbidity occurs in the composition, thereby causing insufficient transparency. On the contrary, when a too large amount of phosphorous stabilizer is included, bleeding occurs, thereby causing deterioration in appearance. That is, when the blending amounts of the stabilizers is within the above-mentioned ranges, a balance between those characteristics is improved.

Process of Producing Molding Material

A process of producing a molding material of the present invention which contains a polymer having a repeating structural unit whose part or whole contains an alicyclic structure, a phenolic stabilizer, a hindered amine light stabilizer, and a phosphorus stabilizer wherein at least a part of the phenolic stabilizer and/or the hindered amine light stabilizer is adhered on surface of particles comprising of the polymer, includes: preparing particles comprising of the polymer including the phenolic stabilizer and/or the hindered amine light stabilizer in particles and phosphorus stabilizer: and adhering the phenolic stabilizer and/or the hindered amine light stabilizer on the surface of the particles.

The particles comprised of a polymer which contain the phenolic stabilizer and/or the hindered amine light stabilizer and contain the phosphorous stabilizer may be produced in a pellet shape by mixing the resin composition including the phenolic stabilizer and/or the hindered amine light stabilizer and the phosphorous stabilizer and the polymer with a use of Henschel mixer, and then pelletizing the composition with a use the extruder.

Next, on the surface of the pellet shaped particles, the phenolic stabilizer and/or the hindered amine light stabilizer are adhered. The adhering method is not particularly limited, but may include methods enabling the stabilizers to adhere to the surface of the pellet by the use of an anchoring effect, a surface tension effect, and static electricity.

In addition, it is preferable that the phenolic stabilizer is adhered in a state of melting on the surface of the pellet. In order to make the phenolic stabilizer to be adhered on the pellet surface, the pellet adhered with the phenolic stabilizer is heated to a temperature in the range of $Tm_1-20°$ C. or higher to $Tm_2+20°$ C. or lower. Accordingly, the phenolic stabilizer of a powder form which is adhered on the surface of the pellet is avoided from being removed.

Hereinafter, the process of producing the molding material will be described in detail.

The molding material of the present invention includes a polymer having a repeating structural unit whose part or whole contains an alicyclic structure, a phenolic stabilizer, a hindered amine light stabilizer, and a phosphorus stabilizer in which at least a part of the phenolic stabilizer and/or hindered amine light stabilizer is presently adhering to the surface of particles of the above polymer.

At least a part of the phenolic stabilizer and/or the hindered amine light stabilizer is presently adhering to the surface of the particles consisting of the polymer. That is, there exists stabilizers which are not subjected to a heating process of melt kneading the phenolic stabilizer and the hindered amine light stabilizer to a temperature higher than a melting point of the polymer with a use of an extruder, a reaction between the phenol stabilizer and the hindered amine light stabilizer is inhibited and thus an effect on transmittance of a light caused by coloration is avoided.

In the molding material of the present invention, it is preferable that the total amount of the phenolic stabilizer being used does not coexist with the hindered amine light stabilizer at 200° C. or higher, preferably 230° C. or higher.

It is preferable that the molding material of the present invention includes the phosphorous stabilizer and the hindered amine light stabilizer in the particles and the phenolic stabilizer is adhered on the surface of the particles.

Preferably, the material can be obtained by adhering a powder [2] on the surface of a pellet [1].

[1] Pellet comprising of 0.25 to 10 parts by mass of a hindered amine light stabilizer and 0.01 to 5 parts by mass of a phosphorous stabilizer, based on 100 parts by mass of a polymer selected from the polymer represented by general formula (1).

[2] Powder including a phenolic stabilizer (which does not include a hindered amine light stabilizer).

The [1] pellet preferably consists of a resin composition including the hindered amine light stabilizer in an amount of 0.25 to 10 parts by mass, preferably 0.3 to 5 parts by mass, more preferably 0.5 to 3 parts by mass and the phosphorous stabilizer in an amount of 0.01 to 5 parts by mass, preferably 0.02 to 2 parts by mass, more preferably 0.05 to 1 parts by mass, based on 100 parts by mass of the polymer selected from the polymer represented by general formula (1). The pellet can be obtained by mixing above resin composition with the use of Henschel mixer and then pelletizing the composition with the use the extruder.

The molding material of the present invention is produced by coating the phenolic stabilizer on a surface of the pellet comprising of the resin composition including 0.25 to 10 parts by mass of the hindered amine light stabilizer and 0.01 to 5 parts by mass of the phosphorous stabilizer, based on 100 parts by mass of the polymer selected from the polymer represented by general formula (1). More preferably, an amount of the phenolic stabilizer being coated is in the range of 0.01 to 10 parts by mass, preferably 0.02 to 2 parts by mass, more preferably 0.05 to 2 parts by mass, based on 100 parts by mass of the pellet. More preferably, the coating process is carried out by adhering the phenolic stabilizer of a powder form onto the surface of the pellet. Here, the adhering means a state where the powders are supported on the surface of the particles by the use of an anchoring effect, a surface tension effect, and static electricity.

Examples of a method of adhering the phenolic stabilizer on the surface of the pellet include, for example, a method of mixing the pellet and the phenolic stabilizer with a use of known blenders such as Henschel mixer, tumbler mixer or the like, a method of adding the phenolic stabilizer in a gas transport tube of the pellet by the use of an external supplying machine, a method of coating by spraying the phenolic stabilizer predissolved in a solvent on the surface of the pellet and then drying the resultant, or the like.

In the molding material of the present invention, when the melting point of the phenolic stabilizer is in the range of $Tm_1$ (lower limit, scale; ° C.) to $Tm_2$ (upper limit, scale; ° C.), the phenolic stabilizer is adhered in a state of melting on the surface of the pellet by heating the pellet coated with the phenolic stabilizer to a temperature in the range of $Tm_1-20°$ C. or higher to $Tm_2+20°$ C. or lower, preferably $Tm_1-15°$ C. or higher to $Tm_2+15°$ C. or lower and a temperature of lower than the melting point of the polymer consisting the pellet, that is, the phenolic stabilizer is attached on the surface of the pellet by heating the phenolic stabilizer to a predetermined temperature. The heating time is not particularly limited, but it is 5 minutes to 24 hours, preferably 10 minutes to 12 hours.

As for the method of adhering the phenolic stabilizer on the surface of the pellet, for example, a method of drying and heating the pellet whose surface is previously adhered with the phenolic stabilizer according to aforementioned method with a use of a known drier; a method of heating the pellet whose surface is adhered with the phenolic stabilizer in a gas transporting device by using the inline injection machine with a use of a inline thermal processing device such as a double-pipe heater; or the like may be mentioned.

As a result, the phenolic stabilizer of a powder form which is adhered on the surface of the pellet is prevented from being removed therefrom. Therefore, even in a case where a strong impact is applied thereto during delivering the molding material, the phenolic stabilizer on the surface of the pellet is hardly removed. Thus, the amount of the stabilizer adhering to the surface of the pellet is hardly varied, thereby maintaining the phenolic stabilizer well.

(Total Light Transmittance and Spectral Light Transmittance)

When the resin composition of the present invention is used for the optics application, transmitting the light is necessary, thus it is preferable that the light transmittance is excellent. As the light transmittance, the total light transmittance or the spectral light transmittance may be selected in accordance with the application.

When the use is assumed in all light or in the multispectral region, it is necessary that the total light transmittance is excellent, the total light transmittance in the condition of not providing an antireflection film on the surface is 85% or more, and preferably 88 to 93%. When the total light transmittance is 85% or more, the essential light quantity can be ensured. For the measurement method of the total light transmittance, a known method is applied, and the measurement apparatus and the like are not limited, but may be exemplified by for example, the method including the steps of a molding the thermoplastic or amorphous resin into a sheet having a thickness of 3 mm, and measuring the total light transmittance of the sheet by molding the molding material of the present invention, by the use of the Haze meter, in accordance with ASTM D1003, or the like.

Further, in the case of an optical system, for example, a laser optical system, using only a specific wavelength region, even when the total light transmittance is not relatively high, it can be still used as long as the spectral light transmittance in the specific wavelength region is in a preferred range. In this case, the spectral light transmittance in the used wavelength is preferably 85% or more, more preferably 86 to 93%. When the spectral light transmittance is 85% or more, a required amount of light can be obtained. For the method and apparatus for measurement, a known method may be applied, and specifically a spectrophotometer may be exemplified.

The molded product comprising the molding material of the present invention has an excellent light transmittance at a wavelength in the range from 300 nm to 450 nm, more preferably at a wavelength in the range from 390 to 420 nm, and particularly preferably at a wavelength in the range from 400 to 420 nm, for example, a laser beam. The spectral light transmittance at a wavelength in the range from 400 nm is 85% or more, preferably 86 to 93%, and the deterioration is hardly generated, and thus the change of the optical performance in the case of using the molded product as the optical component is hardly generated.

In addition, in case of using the molded product as the optical component, the light transmittance can be further improved by applying a known antireflection film on the surface.

Optical Component

The molded product obtained from the molding material of the present invention is excellent in the light transmittance at a wavelength in the range from 300 nm to 450 nm. Accordingly, the molded product may be used as the optical component in the optical system having a light source containing the wavelength in the range from 300 nm to 450 nm. The optical component is a component used for the optical machine, and specifically exemplified by an analytical cell used for a detector for UV, an optical component used for an imaging system using no UV cut filter, a filter for a solar battery, or the like.

The molded product obtained from the molding material of the present invention may be also applied particularly suitably for an optical lens and an optical prism such as an imaging system lens of a camera; a lens such as a microscope, an endoscope, an telescope lens; a total light transmittance type lens such as an eyeglass lens; a pickup lens of an optical disk such as a CD, a CD-ROM, a WORM (a write once read many optical disk), an MO (a rewritable optical disk; a magneto optical disk), an MD (a mini disk), and a DVD (a digital video desk); a laser scanning lens such as an fθ lens of a laser beam printer and a lens for a censor; a prism lens of a finder system of a camera; a lens for a optical pickup device such as a sensor lens, a diffraction plate, a collimator, an objective lens, a beam expander, and a beam shaper; or the like. The molded product obtained from the molding material of the present invention is particularly excellent in the light transmittance at a wavelength in the range from 390 to 420 nm, and thus may be suitably used as a lens for a optical pickup device using a blue-violet laser beam source. The optical disk application may be exemplified by a CD, a CD-ROM, a WORM (a write once read many optical disk), an MO (a rewritable optical disk; a magneto optical disk), an MD (a mini disk), and a DVD (a digital video desk), or the like. Examples of the other optical application include a light guide plate such as a liquid crystal display; an optical film such as a polarization film, a phase difference film, and an optical diffusion film; an optical diffusion film; an optical card; and a liquid crystal display element substrate.

The molding material of the present invention may be molded in a various form of spherical shape, rod-like shape, plate-like shape, column shape, cylindrical shape, tubular shape, fibrous shape, film shape, or sheet shape, and may be used in the various forms above.

The method of molding the molding material for obtaining an optical component is not particularly limited and a known method can be used. For the applications and shapes, although it is different in accordance with the applications and shapes, injection molding method, extrusion molding method, blow molding method, vacuum molding method, and slash molding method can be employed. However, from the viewpoints of moldability and productivity, the injection molding method is preferred. The molding condition is approximately selected according to a purpose of uses or the molding method, but the temperature of the resin in the injection molding method is generally selected from the range of 150 to 400° C., preferably 200 to 350° C., more preferably 230 to 330° C.

Since the molding material of the present invention is excellent in low birefringence, transparency, mechanical strength, thermal resistance, and low absorption, it is possible to be used in various applications, and particularly it is possible to be used suitably in the optical component used in the optical pickup device.

Optical Path Difference Providing Structure

An optical path difference providing structure is a structure having a function of providing a predetermined optical path difference to a predetermined light on at least one optical surface of the optical components through which the light passes.

Hereinafter, it will be described in detail in FIG. 1 which relates to the pickup device.

The molded product obtained from the molding material of the present invention is disposed in a common optical path of a first light source, a second light source, and a third light source and used in an objective optical component OBL having a diffraction structure. Further, in the objective optical component, a saw-like diffraction structure is provided.

This structure is provided in which fine steps are provided in a concentric pattern about the optical axis, and the light beam passing through neighboring orbicular zones are given by the predetermined optical path difference. By setting a pitch (diffraction power) or a depth (brazed wavelength) of the saw structure, as for the 'optical disc of high density', the light beam from the first light source forms a light-collected spot by the second diffraction light, and as for the DVD, the light beam from the second light source forms a light-collected spot by a first diffraction light.

By using the light having a different diffraction order, an efficiency of diffraction in each case is improved so that the amount of light is secured.

As for the CD, it is preferable that the light beam from the third light source is set to a diffracted light having the order same to that of the DVD, but also may be set to the other suitable order. In this example, the first diffracted light is allowed as in the DVD to form a light-collected spot.

Such diffraction structure is one example of the optical path providing structure, and other known structures of 'phase difference providing structure' or 'multi level structure' may also be employed.

Herein, the optical path difference providing structure is employed so as to correct a spherical aberration caused by the difference in thickness of the light disc format, but it also can be used for correcting the aberration caused by the wavelength difference of the using wavelength or the variation in the using wavelength (mode hop). The former is the correction for a spherical chromatic aberration caused by the wavelength difference of 50 nanometer or more, and the latter is the correction for a small wavelength variation changing within 5 nm.

In this example, an example in which the diffraction structure is provided on the objective optical component is described, but it is also possible to be provided on the other elements such as a collimator or coupling lenses.

It is most preferable to use such material in the optical component having a refracting surface and an aspherical surface.

By using the resin composition of the present invention, prolonged use which is realized only in a glass in the past is now realized, and a lens having the optical path difference providing structure which is impossible in a glass lens can be easily provided.

Optical Pickup Device

An optical pickup device is a device having a function of playing back and/or recording information on an optical information recording medium, and which includes a light source for emitting light, and an optical component for irradiating light collecting to the optical information recording medium and/or light reflected from the optical information recording medium. Specifications of the device are not limited. However, in order to describe effects of the present invention, an example of an optical component used for the optical pickup device which can be obtained from the molding material of the present invention will be described with reference to FIG. 1.

In FIG. 1, the target is the optical pickup device using the light source having the using wavelength of 405 nm, so-called blue-violet laser, which is 3-format compatible of 'optical disc of high density', DVD, and CD. The 'optical disc of high density' having the protective substrate thickness t1 of 0.6 mm is supposed as a first optical information medium, the DVD having the protective substrate thickness t2 of 0.6 mm is supposed as a second optical information recording medium, and the CD having the protective substrate thickness t3 of 1.2 mm is supposed as a third optical information recording medium. Each of D1, D2, and D2 represents the thickness of the substrate.

FIG. 1 is a schematic view showing an optical pickup device related to the present invention.

A laser diode LD1 is the first light source, and the blue-violet laser having a wavelength $\lambda 1$ of 405 nm is used but the laser having a wavelength in the range of 390 to 420 nm can be appropriately employed. LD2 is a second light source, and the red laser having a wavelength $\lambda 2$ of 655 nm is used but the laser having a wavelength in the range of 630 to 680 nm can be appropriately employed. LD3 is a third light source, and the infrared laser having a wavelength $\lambda 3$ of 780 nm is used but the infrared laser having a wavelength in the range of 750 to 800 nm can be appropriately employed.

The laser diode LD2 is so-called light source unit of two-laser in one-package in which two light emitting points of the second light source (light source for DVD) and the third light source (light source for CD) are packed in a same package.

In this package, since the second light source is adjusted to be disposed on an optical axis, the third light source is disposed slightly away from the optical axis thereby resulting difference in an image height. Accordingly, techniques for improving this characteristic are already known so that such techniques can be employed if necessary. In the invention, a correcting plate DP is used to perform the correction. In the correcting plate DP, a grating is formed so that the displacement of the optical axes is corrected.

The solid line from LD2 is the light beam of light source for DVD, and the dashed line is the light beam of light source for CD. A beam splitter BS1 transmits or reflects the light beam of the light source entered from LD1 and LD2 in a direction towards the OBL of objective optical component.

In order to improve a beam quality, the light beam transmitted from the LD1 is entered to a beam shaper BSL, sent to the BS1 mentioned above, and then incident to the collimator CL thereby being collimated to infinite parallel light. After, the light beam is sent to the beam expander BE constituted by the beam splitter BS3 and concave and convex lenses, and then entered to the object lens OBL which is the objective optical component. Next, the light beam forms the light-collected spot on the information recording surface via a protective substrate of the first optical information recording medium. Further, the light beam is reflected on the information recording surface, passed the collimator CL via same path as above, a proceeding direction is converted by the beam splitter BS3, and then the light beam is collected to a sensor S1 via a sensor lens SL1. The light beam is subjected to a photoelectric conversion by the sensor thereby being converted into an electronic signal.

In addition, in-between the beam expander BE and objective lens OBL, a λ/4 (quarter the wavelength) plate not shown is disposed, such that gives a just half the wavelength change between the forwarding and returning process thus changing the polarization direction. Therefore, the proceeding direction of the light beam in the returning direction is changed by the BS3.

The beam shaper BSL has curvatures differing respectively for two directions of a direction perpendicular to the optical axis and a direction perpendicular to such direction (having a curvature of rotation asymmetric for the optical axis).

Each of the light beam emitted from the light source, under the semiconductor light source configuration, has a different divergence angle to two directions of a direction perpendicular to the optical axis and a direction perpendicular to such direction, and forms an elliptical shape as viewed in the optical axis direction, but it is not preferable for the light beam of the light source for the optical disc. Therefore, the light beam is subjected to different refractions in each direction by the beam shaper BSL so that the light beam emitted has an approximately circular cross section. In the invention, the beam shaper BSL is disposed in the optical path of LD1, but it can also be disposed in the optical path of LD2.

In the same manner as in LD1, the light beam transmitted from the LD2 forms a light-collected spot on an optical disc (a second optical information recording medium and a third optical information recording medium), reflects and then is finally collected in the sensor S2. Except that an agreement in the optical paths is made by the BS1, there is no change as compared to LD1.

The objective optical component OBL is a single lens in this FIGURE, but it may be formed of a plurality of optical components if necessary.

Since the molded product obtained from the molding material of the present invention has low birefringence, it is obvious that the resin composition can be perfectly used in the device having such configuration.

Actuator

In FIG. 1 relating the optical pickup device, a state where the light beam transmitted from each LDs is collected on the information recording face via a protective substrate of the optical disc is described, but a basic position is replaced by an actuator according to the optical disc for playing back/recording, and the focus slide (focusing) is performed from the reference position.

According to the thicknesses of a protective substrate and the size of a pit in each optical information recording medium, a numerical apertures required for the objective optical component OBL is changed. Here, the numerical apertures for CD is 0.45, and the numerical apertures for DVD and 'optical disc of high density' is 0.65, but those may be appropriately selected from the range of 0.43 to 0.5 as for the CD and from the range of 0.58 to 0.68 as for the DVD. IR is a diaphragm to cut unnecessary light.

The parallel light is incident on the objective lens OBL, but a configuration in which a collimation is not provided and a limited divergent light is incident may be employed.

By using the molding material of the present invention, a long period of use realized only by a conventional method can be realized, and it is obvious that a torque required for an operation by the actuator or the like is significantly decreased as compared to the glass lens.

EXAMPLES

Hereinafter, the present invention will be described further with reference to the following examples, but the present invention is not limited to those examples. In Examples, a measuring method of physical property was carried out by following methods.

Measuring Method (1) Melt Flow Rate (MFR)

The MFR was measured in accordance with a method of ASTM D1238 at 260° C. under a load of 2.16 kg.

(2) Softening Temperature (TMA)

The softening temperature was measured from the thermo-deformational behavior of a sheet having a thickness of 1 mm by using a Thermal Mechanical Analyzer manufactured by DuPont. A quartz needle was placed on the sheet, and the softening temperature was measured as a temperature at which the needle is penetrated into a sheet to a depth of 0.635 mm, when applying a load of 49 g, and elevating a temperature at the rate of 5° C./minute.

(3) Glass Transition Temperature (Tg)

A sample was heated up to 250° C. in nitrogen and under the temperature increasing rate of 10° C./min, and then the sample was quenched. Thereafter, the sample was measured at the temperature increasing rate of 10° C./min, with the use of DSC-20 manufactured by Seiko Denshi Kogyo K.K.

(4) Melting Points of Phenolic Stabilizer ($Tm_1$ and $Tm_2$)

A test piece was extracted in a capillary in a thickness of 2 to 3 mm and heated at the rate of 10° C./min while checking a state of the test piece with eyes. The melting start temperature of the test piece was set as $Tm_1$ (lower limit, scale; ° C.) and the melting end temperature of the test piece was set to $Tm_2$ (upper limit, scale; ° C.)

(5) Haze

The Haze was measured accordance with a method of ASTM D1003, by the use of a test piece having an optical surface of 45 mmφ×3 mm (thick) obtained by being subjected to injection molding by the injection molding machine (IS-50 manufactured by TOSHIBA MACHINE CO., LTD) which is set to a cylinder temperature at 260° C. and a mold temperature at 125° C.

(6) Spectral Light Transmittance at Wavelength of 400 nm (T400)

The spectral light transmittance at a wavelength of 400 nm was measured by a spectrophotometer by using a test piece having an optical surface of 45 mmφ×3 mm (thick) obtained by performing injection molding by means of an injection molding machine (IS-50 manufactured by TOSHIBA MACHINE CO., LTD) which is set to a cylinder temperature at 260° C. and a mold temperature at 125° C.

(7) Reliability Evaluation with Violet Laser Beam

By using a laser diode (TC4030S-F405ASU manufactured by NEOARK Corporation), a blue-violet laser beam having a wavelength of 405±10 nm, by 200 mW/cm$^2$, was irradiated to center of the test piece place having an optical surface of 45 mmφ×3 mm (thick) obtained by being subjected to injection molding by the injection molding machine (IS-50 manufactured by TOSHIBA MACHINE CO., LTD) which is set to a cylinder temperature at 260° C. and a mold temperature at 125° C., in thermostatic bath of 60° C., for 1,000 hours. Before irradiation, and every 250 hours after irradiation until 1,000 hour, the RMS value of wave surface in the center 3 mmφ of the test piece was measured to evaluate a variation with time. For the measurement of RMS value, the laser interferometer (PTI 250RS manufactured by Zygo Corporation (linear polarization specification)) was used. In addition, the irradiation part in the test piece was observed with a stereomicroscope, to confirm the presence of absence of a white turbidity and an adherence of foreign substance. The results are indicated, using the following symbols.

A: No change of RMS value

B: Rate of change of RMS value was observed less than $0.01\lambda$.

C: RMS value was changed by $0.01\lambda$ or more. Alternatively, the measurement was impossible.

D: The white turbidity and The adherence of foreign substance was significantly observed.

[Stabilizers being Used]

As the hindered amine light stabilizer, following compounds were used.

[A]: Bis(2,2',6,6'-tetramethyl-4-piperidyl)sebacate having a molecular weight of 481, manufactured by Chiba-Geigy Co., Ltd., trade name TINUVIN 770.

[B]: Poly[6-(1,1,3,3-tetramethylbutyl)amino]-1,3,5-triazine-2,4-diyl][(2,2,6,6-tetramethyl-4-piperidyl)-imino]hexamethylene[(2,2,6,6-tetramethyl-4-piperidyl)imino] having a molecular weight of 2000 to 3,100, manufactured by Chiba-Geigy Co., Ltd., trade name CHIMASSORB 944.

As the phenolic stabilizer, following compound was used.

[C]: Tetrakis[methylene-3-(3,5-di-t-butyl-4-hydroxyphenyl)propionate]methane, ($Tm_1$:117° C., $Tm_2$: 120° C.)

As the phosphorous stabilizer the following compound was used.

[D]: Tris[2-[[2,4,8,10-tetra-t-butyldibenzo[d,fg][1,3,2]dioxaphosphepin-6-yl]oxy]ethyl]amine.

As the stabilizer having both structure of the phenolic stabilizer and the phosphorous stabilizer, the following compound was used.

[E]: 6-[3-(3-t-butyl-4-hydroxy-5-methylphenyl)propoxy]-2,4,8,10-tetrakis-t-butyldibenzo[d,f][1.3.2] dioxaphosphepin.

Production of resin composition pellets (1) to (10)

The raw polymers X, Y, and Z were produced according to the following methods.

[Raw Polymer X]

(Production of Catalyst)

$VO(OC_2H_5)Cl_2$ was diluted with cyclohexane to prepare a vanadium catalyst of which the vanadium concentration is 6.7 mmol/L-cyclohexane. Ethylaluminum sesquichloride (Al $(C_2H_5)_{1.5}Cl_{1.5}$) was diluted with cyclohexane to prepare an organoaluminum compound catalyst of which the aluminum concentration is 107 mmol/L-hexane.

(Polymerization)

The copolymerization reaction of ethylene and tetracyclo [$4.4.0.1^{2.5},1^{7,10}$]-3-dodecene was continuously carried out by using a stirring type polymerization apparatus (inner diameter of 500 mm, reaction volume of 100 L). Upon carrying out the copolymerization reaction, the vanadium catalyst prepared by the above process was supplied to the polymerization apparatus so that the vanadium catalysis concentration become 0.6 mmol/L, related to cyclohexane in the polymerization apparatus used as the polymerization solvent.

In addition, ethylaluminum sesquichloride which is organoaluminum compound was supplied to the polymerization apparatus so as to be Al/V=8.0. The copolymerization reaction was continuously carried out at the polymerization temperature of 11° C. and the polymerization pressure of 1.8 kg/$cm_2$G.

(Decalcification)

The polymerization reaction was terminated by adding NaOH solution having the concentration of 25% by weight as water and a pH adjuster, to ethylene-tetracyclo[$4.4.0.1^{2.5},1^{7,10}$]-3-dodecene copolymer solution extracted from the polymerization apparatus, and the catalyst residue existing in the copolymer was removed (decalfified) from the copolymer solution.

(Solvent Removal)

The cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/$cm^2$G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/$cm^2$G as heat source, and a flash hopper (volume of 200 L), from the cyclohexane solution of the copolymer subjected to the heating process, cyclohexane which is a polymerization solvent as well as most unreacted monomer was removed, to obtain a flash dried cyclic olefin random copolymer in the melt state. Thereafter, by the use of the twin screw kneading extruder with a vent, the cyclic olefin random copolymer in the melt state was charged to the resin insertion site of the extruder, and aspirated through the trap by the vacuum pump for the purpose of removing a volatile from the vent site. Subsequently, the reactant was made into a pellet by an under water pelletizer equipped to outlet of the extruder, and the obtained pellet was dried with heated air at 100° C. for 4 hours.

The physical properties of the copolymer thus obtained are as follows: MFR; 36 g/10 min., TMA; 147° C., Tg; 137° C.

[Raw Polymer Y]

(Polymerization)

To a pressure-resistant container purged with nitrogen, 7.68 kg of styrene and 0.32 kg of isoprene were added, mixed, stirred, 32 kg of anhydrated cyclohexane, 0.4 kg of mixed monomer, 0.01 kg of dibutyl ether were charged, 0.0454 kg of hexane solution (concentration of 15%) of n-butyllithium was added while stirring at 50 degrees C. to carried out the polymerization. After a lapse of 0.5 hours from starting the polymerization, 7.6 kg of a mixed monomer was added to the solution continuously over 1 hour. After a lapse of 0.5 hours from completing the addition of the mixed monomer, 0.01 kg of isopropyl alcohol was added to the solution, to obtain a polylmerization reaction solution in which styrene-isoprene random copolymer was dissolved.

(Hydrogenation Reaction)

Next, to 40 kg of the polymerization reaction solution, 0.3 kg of a stabilized nickel hydrogenated catalyst E22U (60% nickel supported silica-alumina carrier manufactured by Nikki Chemical Co., Ltd.) was added, mixed to obtain a mixed solution, and the mixed solution was charged to an autoclave. To the autoclave, a hydrogen gas was supplied, and the hydrogenation reaction was carried out in the autoclave at 160° C. and 4.5 MPa for 6 hours, wile being stirred.

(Decalcification)

After the hydrogenation reaction is completed, the hydrogenated catalyst is removed by filtering to obtain a colorless transparent solution.

(Solvent Removal)

The cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/cm²G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/cm²G as heat source, and a flash hopper (volume of 200l), from the cyclohexane solution of the copolymer subjected to the heating process, cyclohexane which is a polymerization solvent as well as most unreacted monomer was removed, to obtain a flash dried vinyl alicyclic hydrocarbon polymer in the melt state. Thereafter, by the use of the twin screw kneading extruder with a vent, the vinyl alicyclic hydrocarbon polymer in the melt state was charged to the resin insertion site of the extruder, and aspirated through the trap by the vacuum pump for the purpose of removing a volatile from the vent site. Subsequently, the reactant was made into a pellet by an under water pelletizer equipped to outlet of the extruder, and the obtained pellet was dried with heated air at 100° C. for 4 hours.

The physical properties of the vinyl alicyclic hydrocarbon copolymer thus obtained are as follows: MFR; 22 g/10 min., TMA; 133° C., Tg; 124° C.

[Raw Polymer Z]
(Polymerization)

To 50 kg of dehydrated cyclohexane, 0.082 kg of 1-hexene, 0.015 kg of dibutyl ether, 0.03 kg of triisobutylaluminum were charged to the reactor and mixed at room temperature under the nitrogen atmosphere, and then 20 kg of 8-methyl-tetracyclo[4.4.0.1$^{2,5}$.1$^{7,10}$]-dodeca-3-ene (methyltetracyclododecene), (hereinafter abbreviated to as "MTD") and 8 kg of tungsten hexachloride (0.7% toluene solution) were added thereto continuously over 2 hours to carry out the polymerization.

(Hydrogenation Reaction)

To the polymerization solution, 0.106 kg of butylglicidyl ether and 0.052 kg of isopropyl alcohol were added to inactivate the polymerization catalyst to terminate the polymerization reaction. Thereafter, to 70 kg of the reaction solution containing the obtained open-ring polymer, 30 kg of cyclohexane was added, and 0.5 kg of a nickel-alumina catalyst (manufactured by Nikki Chemical Co., Ltd.) was further added as the polymerization catalyst. To the solution, hydrogen was supplied to pressurize at 5 MPa, and the solution was heated to 200° C. while stirring to react for 4 hours.

(Decalcification)

Thereafter, the hydrogenation catalyst was removed by the filtration to obtain a colorless transparent solution.

(Solvent Removal)

The cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/cm²G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/cm²G as heat source, and a flash hopper (volume of 200l), from the cyclohexane solution of the copolymer subjected to the heating process, cyclohexane which is a polymerization solvent as well as most unreacted monomer was removed, to obtain a flash dried hydrogenation product of the MTD open-ring polymer in the melt state. Thereafter, by the use of the twin screw kneading extruder with a vent, the hydrogenation product of the MTD open-ring polymer in the melt state was charged to the resin insertion site of the extruder, and aspirated through the trap by the vacuum pump for the purpose of removing a volatile from the vent site. Subsequently, the reactant was made into a pellet by an under water pelletizer equipped to outlet of the extruder, and the obtained pellet was dried with heated air at 100° C. for 4 hours.

The physical properties of the hydrogen additive of the ring-opening polymer thus obtained are as follows: MFR; 16 g/10 min., TMA; 144° C., Tg; 135° C.

Next, by using the polymers as raw materials, the polymers were kneaded in a state of melting and pelletized with a use of an twin-screw extruder of 44 mmΦ under nitrogen gas stream according to conditions described in Table 1.

TABLE 1

| | | stabilizers | | | | |
|---|---|---|---|---|---|---|
| | Species of | Hindered amine light stabilizer | | Phenolic stabilizer | Phosphorous stabilizer | |
| | raw polymer | [A] | [B] | [C] | [D] | [E] |
| Pellet (1) | X | 1.0 | 0.5 | — | — | — |
| Pellet (2) | X | 1.0 | 0.5 | — | 0.3 | — |
| Pellet (3) | X | 1.0 | 0.5 | — | — | 0.2 |
| Pellet (4) | X | — | 2.0 | — | — | — |
| Pellet (5) | X | — | 2.0 | — | 0.4 | — |
| Pellet (6) | X | — | — | 0.8 | — | — |
| Pellet (7) | X | — | 1.5 | 0.2 | 0.3 | — |
| Pellet (8) | X | — | — | 0.2 | 0.3 | — |
| Pellet (9) | Y | 0.4 | 0.2 | — | — | 0.2 |
| Pellet (10) | Z | — | 2.0 | — | — | 0.5 |

Examples 1 to 9 and Comparative Examples 1 to 4

First, as shown in Table 2, one or two or more kinds of pellets were put into a plastic bag of which a dead weight of a volume 60 L was measured in advance. Next, stabilized powders shown in Table 2 were additionally put into the plastic bag, the plastic bag was expanded by blowing the nitrogen gas thereto, and the inlet of the plastic bag was bound and then shaken so that the inner substances become homogeneous. At a time point when the stabilized powders were homogeneously adhered onto the pellets, the pellets adhered with the stabilizer were taken out of the plastic bag and the weight of the plastic bag was measured, thereby calculating the weight of the stabilizer adhered onto the plastic bag. By subtracting the amount of stabilizer adhered onto the plastic bag from the amount of stabilizer blown into the bag, an amount of stabilizer adhering to the pellets (weight % to the pellet) was measured and listed in Table 2. A part of the pellets was heated in an air oven at 100° C. for 30 minutes as shown in Table 2 for the purpose of preventing a removal of the stabilizer adhered onto the pellets.

In Table 3, ratios (%) of blending amounts and adhering amounts of the hindered amine light stabilizer and the phenolic stabilizer in the inside or the surface of the pellets were shown. Furthermore, the numerical values means ratios when it is assumed that the total ratio of the stabilizers contained in the pellets and adhered onto its surfaces are 100% by mass.

TABLE 2

| | Pellet being used | | | | | | | | | | Adhering stabilizer | | | Aftertreatment | |
|---|---|---|---|---|---|---|---|---|---|---|---|---|---|---|---|
| | (1) | (2) | (3) | (4) | (5) | (6) | (7) | (8) | (9) | (10) | [B] | [C] | Adhering amount | Temperature | Time |
| Example 1 | — | 10 Kg | — | — | — | — | — | — | — | — | — | 25 g | 0.22% | — | — |
| Comparative example 1 | 10 Kg | — | — | — | — | — | — | — | — | — | — | 25 g | 0.21% | — | — |
| Example 2 | — | 10 Kg | — | — | — | — | — | — | — | — | — | 55 g | 0.51% | — | — |
| Example 3 | — | — | 10 Kg | — | — | — | — | — | — | — | — | 15 g | 0.10% | — | — |
| Comparative example 2 | — | — | — | — | 7.5 kg | 2.5 kg | — | — | — | — | — | — | — | — | — |
| Comparative example 3 | — | — | — | 7.5 kg | — | 2.5 kg | — | — | — | — | — | — | — | — | — |
| Comparative example 4 | — | — | — | — | — | — | 10 kg | — | — | — | — | — | — | — | — |
| Example 4 | — | — | — | — | — | — | 10 kg | — | — | — | — | 15 g | 0.13% | — | — |
| Example 5 | — | 10 Kg | — | — | — | — | — | — | — | — | — | 25 g | 0.22% | 110° C. | 30 min. |
| Comparative example 5 | — | — | — | — | — | 10 kg | — | — | — | — | 100 g | — | 0.88% | — | — |
| Example 6 | — | — | — | — | — | — | 10 kg | — | — | — | — | 35 g | 0.31% | — | — |
| Example 7 | — | — | — | — | — | — | — | 10 kg | — | — | 65 g | — | 0.58% | — | — |
| Example 8 | — | — | — | — | — | — | — | — | 10 kg | — | — | 15 g | 0.10% | — | — |
| Example 9 | — | — | — | — | — | — | — | — | — | 10 kg | — | 15 g | 0.12% | — | — |

TABLE 3

| | Inside pellet | | Pellet surface | |
|---|---|---|---|---|
| | Hindered amine light stabilizer | Phenolic stabilizer | Hindered amine light stabilizer | Phenolic stabilizer |
| Example 1 | 100 wt % | — | — | 100 wt % |
| Comparative example 1 | 10 wt % | — | — | 100 wt % |
| Example 2 | 100 wt % | — | — | 100 wt % |
| Example 3 | 100 wt % | — | — | 100 wt % |
| Comparative example 2 | 100 wt % (*1) | 100 wt % (*1) | — | — |
| Comparative example 3 | 100 wt % (*1) | 100 wt % (*1) | — | — |
| Comparative example 4 | 100 wt % (*2) | 100 wt % (*2) | — | — |
| Example 4 | 100 wt % | 60 wt % | — | 40 wt % |
| Example 5 | 100 wt % | — | — | 100 wt % |
| Comparative example 5 | — | 100 wt % | 100 wt % | — |
| Example 6 | 100 wt % | 40 wt % | — | 60 wt % |
| Example 7 | — | 100 wt % | 100 wt % | — |
| Example 8 | 100 wt % | — | — | 100 wt % |
| Example 9 | 100 wt % | — | — | 100 wt % |

(*1): hindered amine light stabilizer and phenolic stabilizer exist in other pellet.
(*2): hindered amine light stabilizer and phenolic stabilizer exist in the same pellet.

An injection molding was carried out in the molding materials thus obtained, and Haze and light transmittance at 400 nm were measured and blue-violet laser reliability was evaluated. The results are shown in Table 4.

TABLE 4

| | optical property evaluation | | laser reliability evaluation | | | | |
|---|---|---|---|---|---|---|---|
| | HAZE (%) | T400 (%) | Before irradiation | 250 hours | 500 hours | 750 hours | 1000 hours |
| Example 1 | 0.4 | 87.1 | A | A | A | A | A |
| Comparative example 1 | 0.4 | 87.0 | A | A | A | AD | BD |
| Example 2 | 1.1 | 86.4 | A | A | A | A | A |
| Example 3 | 0.3 | 87.0 | A | A | A | A | A |
| Comparative example 2 | 1.3 | 86.2 | A | A | A | A | B |
| Comparative example 3 | 1.2 | 86.5 | | A | A | AD | BD |
| Comparative example 4 | 0.5 | 83.2 | | A | A | A | B |
| Example 4 | 0.6 | 85.3 | | A | A | A | A |
| Example 5 | 0.3 | 87.2 | | A | A | A | A |
| Comparative example 5 | 4.2 | 81.1 | D | BD | CD | CD | CD |
| Example 6 | 0.7 | 85.5 | | A | A | A | A |
| Example 7 | 1.0 | 84.7 | | A | A | A | AD |

TABLE 4-continued

| | optical property evaluation | | laser reliability evaluation | | | | |
|---|---|---|---|---|---|---|---|
| | HAZE (%) | T400 (%) | Before irradiation | 250 hours | 500 hours | 750 hours | 1000 hours |
| Example 8 | 0.5 | 91.3 | A | A | A | A | AD |
| Example 9 | 0.4 | 90.2 | A | A | A | AD | AD |

From the above results, it is understood that a molding material high in optical properties and blue-violet laser reliability can be obtained by the present invention.

In the molding material of the present invention, it is possible to obtain an optical component in which sufficient optical properties have, the deterioration is hardly generated although the laser light nearby the UV is used, change in the optical properties during the use are small, and the light transmittance is maintained high.

The invention claimed is:

1. A process of producing a molding material which comprises a polymer, a phenolic stabilizer, a hindered amine light stabilizer, and a phosphorus stabilizer, wherein the polymer has a repeating structural unit whose part or whole contains an alicyclic structure, in which the phenolic stabilizer is adhered on surface of pellets comprising a resin composition containing the polymer, the hindered amine light stabilizer and the phosphorus stabilizer, the process comprising:

step (a): producing the pellets by pelletizing the resin composition containing the polymer, the hindered amine light stabilizer and the phosphorus stabilizer with use of an extruder, wherein the hindered amine light stabilizer contained in the resin composition is in an amount of 100% by mass of the total amount of the hindered amine light stabilizer included in the molding material; and step (b): adhering the phenolic stabilizer with 100% by mass of the total amount of the phenolic stabilizer included in the molding material on the surface of said pellets after said step (a).

2. The process of producing the molding material as set forth in claim 1,
wherein said step (b) includes a step for adhering in a state of melting said phenolic stabilizer on surface of said pellets by heating said pellets whose surface is adhered with the phenolic stabilizer to a temperature in a range of $Tm_1 - 20°$ C. or higher to $Tm_2 + 20°$ C. or lower (where $Tm_1$ and $Tm_2$ respectively represent lower limit and higher limit of a melting point of the phenolic stabilizer).

3. The process of producing the molding material as set forth in claim 1, wherein said polymer is a cyclic olefin polymer having at least one structure represented by general formula (1):

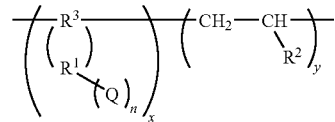

where x and y each represents a copolymerization ratio and is a real number satisfying $0/100 \leq y/x \leq 95/5$; with x and y being presented on a molar basis;

n represents a number of a substituent Q and is an integer satisfying $0 \leq n \leq 2$;

$R^1$ is a 2+n valent group selected from groups consisting of a hydrocarbon group having 2 to 20 carbon atoms;

$R^2$ is a hydrogen atom or a monovalent group selected from groups consisting of a hydrocarbon group having 1 to 10 carbon atoms;

$R^3$ is a 4 valent group selected from groups consisting of a hydrocarbon group having 2 to 10 carbon atoms;

Q is $COOR^4$ (where $R^4$ is a hydrogen atom or a monovalent group selected from groups consisting of a hydrocarbon group having 1 to 10 carbon atoms); and each of $R^1$, $R^2$, $R^3$, and Q may be comprised of one kind group selected from said groups, or in the case of each of $R^1$, $R^2$, $R^3$, and Q may be comprised of two or more kind groups selected from said groups, each of $R^1$, $R^2$, $R^3$, and Q is comprised of selected groups in arbitrary proportion.

4. The process of producing the molding material as set forth in claim 1, wherein said polymer is a cyclic olefin polymer having at least one structure represented by general formula (2):

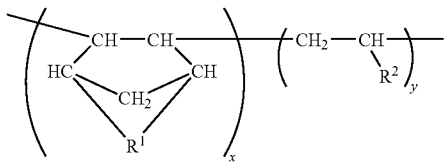

where $R^1$ is a divalent group selected from groups consisting of a hydrocarbon group having 2 to 20 carbon atoms;

$R^2$ is a hydrogen atom or a monovalent group selected from groups consisting of a hydrocarbon group having 1 to 10 carbon atoms;

each of $R^1$ and $R^2$ may be comprised of one kind group selected from said groups, or in the case of each of $R^1$ and $R^2$ may be comprised of two or more kind groups selected from said groups, each of $R^1$ and $R^2$ is comprised of selected groups in arbitrary proportion; and x and y each represents a copolymerization ratio and is a real number satisfying $5/95 \leq y/x \leq 95/5$, x and y representation a molar basis.

5. The process of producing the molding material as set forth in claim 1, wherein said polymer is a copolymer of tetracyclo[4,4,0,1$^{2,5}$,1$^{7,10}$]-3-dodecene and ethylene.

* * * * *